(12) United States Patent
Ogawa et al.

(10) Patent No.: US 10,838,281 B2
(45) Date of Patent: Nov. 17, 2020

(54) DISPLAY DEVICE

(71) Applicant: Panasonic Intellectual Property Management Co., Ltd., Osaka (JP)

(72) Inventors: Shotaro Ogawa, Osaka (JP); Koji Aoto, Hyogo (JP); Akira Shiokawa, Osaka (JP); Makoto Morita, Hyogo (JP); Takashi Ishikawa, Osaka (JP); Takashi Suzuki, Osaka (JP); Yasutaka Tsutsui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 495 days.

(21) Appl. No.: 15/179,974

(22) Filed: Jun. 11, 2016

(65) Prior Publication Data
US 2016/0291437 A1    Oct. 6, 2016

Related U.S. Application Data

(63) Continuation of application No. PCT/JP2015/003929, filed on Aug. 5, 2015.

(30) Foreign Application Priority Data

Aug. 7, 2014  (JP) ................................. 2014-161502

(51) Int. Cl.
*G02F 1/153* (2006.01)
*G02F 1/03* (2006.01)
(Continued)

(52) U.S. Cl.
CPC ............ *G02F 1/163* (2013.01); *G02F 1/1503* (2019.01); *G02F 1/1506* (2013.01); *G02F 1/161* (2013.01); *G02F 1/19* (2013.01)

(58) Field of Classification Search
CPC ...... G02F 1/155; G02F 1/1523; G02F 1/1525; G02F 1/1521; G02F 1/1533; G02F 1/03; G02F 1/0316; G02F 3/16; G02F 1/63; C09K 9/02; B60R 1/088; H04N 9/3137; H04N 9/22
(Continued)

(56) References Cited

U.S. PATENT DOCUMENTS 5,280,381 A    1/1994  Mason
6,261,478 B1   7/2001  Udaka
(Continued)

FOREIGN PATENT DOCUMENTS

JP    6-222399     8/1994
JP    11-142895    5/1999
(Continued)

OTHER PUBLICATIONS

International Search Report of PCT application No. PCT/JP2015/003929 dated Oct. 13, 2015.

*Primary Examiner* — Dawayne Pinkney
(74) *Attorney, Agent, or Firm* — Wenderoth, Lind & Ponack, L.L.P.

(57) ABSTRACT

There is provided a display device having an electrochromic element placed in the display device. The electrochromic element has: a light transmittance of 70% or more and a light reflectance of 20% or less at a central wavelength of a visible spectrum when in a transparent state; and a light reflectance of 65% or more at the central wavelength of the visible spectrum when in a mirror state. By this, the display device is not only highly effective in terms of light-shielding, heat blocking, screening, etc., but is also switchable between a transmissive type and a reflective type.

1 Claim, 16 Drawing Sheets

(51) Int. Cl.
  *G02F 1/15* (2019.01)
  *G09G 3/19* (2006.01)
  *G09G 3/38* (2006.01)
  *G02F 1/163* (2006.01)
  *G02F 1/1503* (2019.01)
  *G02F 1/19* (2019.01)
  *G02F 1/1506* (2019.01)
  *G02F 1/161* (2006.01)

(58) Field of Classification Search
  USPC ............ 359/265–275, 277, 245–247, 242; 345/49, 105, 107; 248/817; 438/929
  See application file for complete search history.

(56) References Cited

U.S. PATENT DOCUMENTS

| | | |
|---|---|---|
| 2006/0103911 A1 | 5/2006 | Baumann et al. |
| 2008/0316574 A1 | 12/2008 | Baumann et al. |
| 2010/0097684 A1* | 4/2010 | Ono .................. G02F 1/1506 359/270 |
| 2011/0149367 A1 | 6/2011 | Nagamura et al. |
| 2014/0218781 A1 | 8/2014 | Kobayashi et al. |
| 2016/0026054 A1 | 1/2016 | Kobayashi et al. |

FOREIGN PATENT DOCUMENTS

| | | |
|---|---|---|
| JP | 2005-284148 | 10/2005 |
| JP | 2008-521031 | 6/2008 |
| JP | 2008-203740 | 9/2008 |
| JP | 2009-098225 | 5/2009 |
| WO | 2009/136626 | 11/2009 |
| WO | 2012/118188 | 9/2012 |
| WO | 2013/180125 | 12/2013 |

\* cited by examiner

DISPLAY DEVICE

BACKGROUND

1. Technical Field

The present disclosure relates to a display device.

2. Description of the Related Art

Of various types of display devices, there is a strong demand for development of a display device that has a dimming function capable of adjusting an amount of incident light coming from outside. Commercialization of the display device has also proceeded aiming at light-shielding, heat blocking, and screening effects, etc. For such a display device, for example, there is a dimming device using a polymer dispersed liquid crystal material, a suspended particle device (SPD) material, an electrochromic material, etc. The dimming device can change from a transparent state to a dark blue colored state, or change from a transparent state to a milk-white colored state.

Unexamined Japanese Patent Publication No. 2008-203740 discloses a transmissive dimming device including a dimming element that reversibly changes a tone of color of two color change films, according to application of a voltage. The color change films are composed of tungsten oxide and iridium oxide which are electrochromic materials.

SUMMARY

The present disclosure provides a display device that is not only highly effective in terms of light-shielding, heat blocking, screening, etc., but is also switchable between a transmissive type and a reflective type.

A display device of the present disclosure is a display device having an electrochromic element placed in the display device. The electrochromic element has: a light transmittance of 70% or more and a light reflectance of 20% or less at a central wavelength of a visible spectrum when in a transparent state; and a light reflectance of 65% or more at the central wavelength when in a mirror state.

The display device of the present disclosure is not only highly effective in terms of light-shielding, heat blocking, screening, etc., but is also switchable between a transmissive type and a reflective type.

DETAILED DESCRIPTION

An exemplary embodiment will be described in detail below with reference to the drawings as appropriate. Note, however, that an unnecessarily detailed description may be omitted. For example, a detailed description of already well-known matters or an overlapping description of substantially the same configurations may be omitted. This is to avoid the following description from becoming unnecessarily redundant and facilitate understanding of a person skilled in the art.

Note that the inventors provide the accompanying drawings and the following description in order for a person skilled in the art to sufficiently understand the present disclosure, and thus, the subject matter recited in the claims is not intended to be limited by the accompanying drawings and the following description.

First Exemplary Embodiment

A first exemplary embodiment will be described below with reference to the drawings.

[1. Basic Configuration of a Display Device]

Figure 1:
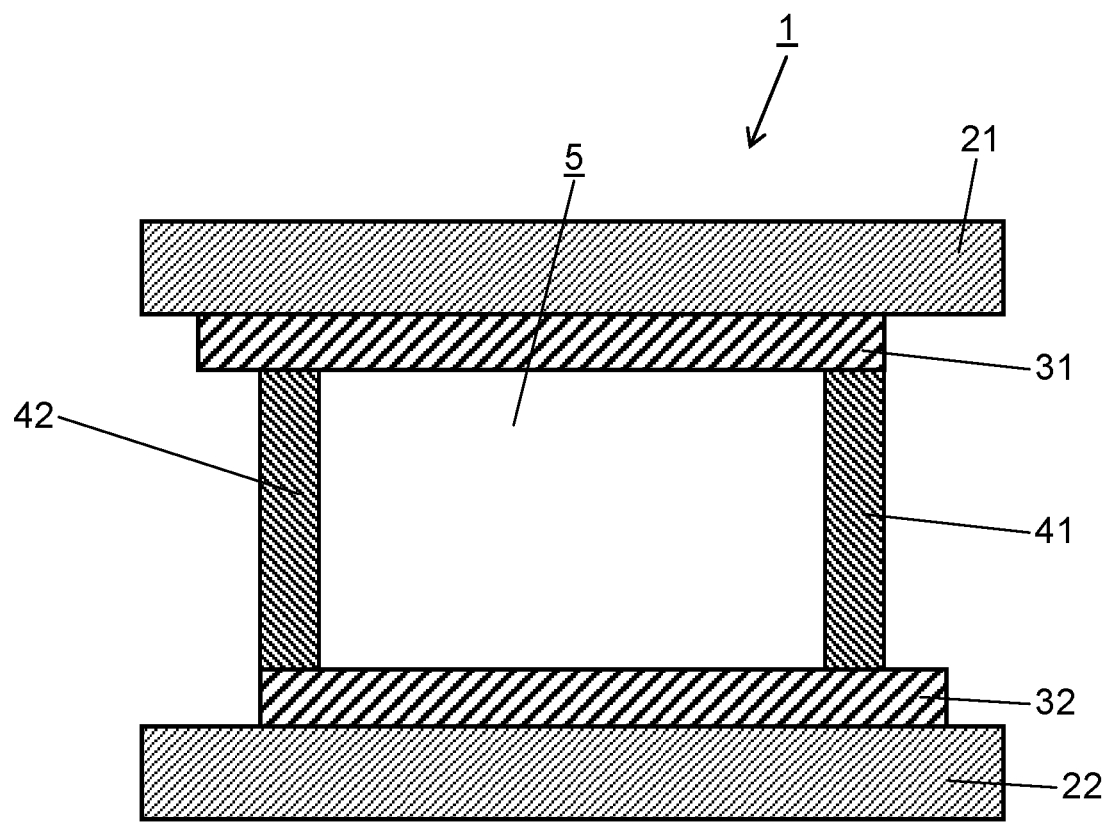
FIG. 1 is a schematic cross-sectional view showing an example of a display device according to a first exemplary embodiment.

FIG. 1 is a schematic cross-sectional view showing an example of a display device according to the first exemplary embodiment. FIG. 1 shows an example of a display device having electrochromic elements placed in the display device. Display device 1 includes a pair of substrates 21, 22 and a pair of electrodes 31, 32 which are formed on facing surfaces of substrates 21, 22, respectively. Substrate 21 having electrode 31 and substrate 22 having electrode 32 are disposed with a predetermined gap provided by spacers 41, 42. Electrolyte solution 5 which serves as electrochromic elements is filled in the predetermined gap between electrodes 31, 32.

Substrates 21, 22 are to hold filled electrolyte solution 5. Since both of substrates 21, 22 are transparent, display device 1 can be of a transmissive type. Materials of substrates 21, 22 are not particularly limited as long as the materials have hardness required for the display device, and chemical stability. It is favorable to employ, for example, glass or plastic.

Electrodes 31, 32 formed on the facing surfaces (inner surfaces) of substrates 21, 22 are to apply voltages to filled electrolyte solution 5. Materials of electrodes 31, 32 are not particularly limited as long as the materials are for transparent electrodes and have suitable conductivity. It is favorable to employ, for example, indium tin oxide (hereinafter, referred to as ITO) or indium zinc oxide (hereinafter, referred to as IZO) (registered trademark of Idemitsu Kosan Co., Ltd.). Note that the gap between electrodes 31, 32 is also not particularly limited as long as, for example, silver can be sufficiently deposited as fine particles from a silver compound contained in the electrochromic elements which will be described later. The gap between electrodes 31, 32 is adjusted as appropriate, according to an intended application of the display device. The gap may be, for example, about 10 μm to 1000 μm. When the gap between electrodes 31, 32 is reduced, electric power required for drive increases and thus a change rate increases. Reversely, when the gap between electrodes 31, 32 is increased, electric power required for drive decreases and thus the change rate decreases. This is because capacitance of a capacitor formed by the two electrodes increases when the gap is reduced, and decreases when the gap is increased. Since the capacitance of the capacitor is also proportional to facing areas of the two electrodes, a suitable gap needs to be selected as appropriate, according to the areas of the electrodes.

Note that it is also possible to form one of electrodes 31, 32 as a transparent, conductive particle-modified electrode having relatively large projections and depressions and nano-order projections and depressions which are formed on a surface of the electrode by spraying and baking particles, and to form the other electrode as a smooth electrode. When silver is deposited on the particle-modified electrode, a display device in a black state instead of a mirror state can be implemented. Furthermore, the particle-modified electrode can also be used to increase an apparent switching speed between a display state and a mirror state, or to increase apparent light reflectance in a mirror state.

Electrolyte solution 5 contains an electrochromic material and contains, in addition to the electrochromic material, at least a supporting electrolyte, a mediator, and a solvent.

The electrochromic material is a material that induces an oxidation-reduction reaction by application of a voltage, and is a silver compound which is salt containing silver ions. The silver compound is a kind of substance with a small ionization tendency (silver, platinum, palladium, etc.). The silver compound is favorable, for example, because the silver compound is a metal that forms a metallic color thin film with no coloration when display device 1 is used as a specular surface, and because of price and easiness of handling. The electrochromic material can allow silver fine particles to be deposited or to disappear by an oxidation-reduction reaction. When the electrochromic material allows silver fine particles to be deposited, display device 1 corresponds to a reflective display device in a mirror state. When the electrochromic material allows silver fine particles to disappear (silver fine particles are dissolved in electrolyte solution 5), display device 1 corresponds to a transmissive display device in a transparent state.

Note that, for example, by controlling a particle diameter of silver fine particles or sizes of projections and depressions of a particle-modified electrode when the silver fine particles are deposited, display device 1 can be allowed to correspond not only to a reflective display device in a mirror state, but also to a transmissive display device in a transparent state that emits color such as black, blue, and red.

The silver compound which is the electrochromic material is not particularly limited. Examples of the silver compound include $AgNO_3$, $AgClO_4$, $AgBr$, $AgCl$, and silver bis(trifluoromethanesulfonyl)imide. Content of the electrochromic material in the electrochromic elements is not particularly limited as long as an oxidation-reduction reaction can be induced by application of a voltage. The content of the electrochromic material in the electrochromic elements is adjusted as appropriate, according to a type of silver compound or types of other materials such as a supporting electrolyte, a mediator, a solvent, and a gelling agent. For example, when a 10 ml electrolyte solution is prepared, it is favorable that the content of the electrochromic material be 0.005 mM to 50 mM, more preferably, 0.05 mM to 5 mM.

The supporting electrolyte is to promote oxidation-reduction of the electrochromic material, etc., and is a supporting salt. The supporting electrolyte is not particularly limited as long as the supporting electrolyte has such a function. It is favorable that the supporting electrolyte be a bromine compound in terms of that the bromine compound does not have side reactions and have high solubility and high ion conductivity. Examples of the bromine compound include tetrabutylammonium bromide (hereinafter, also referred to as TBABr), LiBr, KBr, NaBr, tetrabutylammonium chloride, tetrabutylammonium iodide, lithium bis(trifluoromethanesulfonyl)imide, and potassium bis(trifluoromethanesulfonyl)imide. Content of the supporting electrolyte in the electrochromic elements is not particularly limited as long as the oxidation-reduction of the electrochromic material, etc., can be promoted. The content of the supporting electrolyte in the electrochromic elements is adjusted as appropriate, according to a type of silver compound, etc. For example, when a 10 ml electrolyte solution is prepared, it is favorable that the content of the supporting electrolyte be 0.02 mM to 300 mM, more preferably, 0.2 mM to 30 mM.

The mediator is a material that can perform oxidation-reduction using electrochemically lower energy than silver. By an oxidant of the mediator giving and receiving electrons to/from silver whenever necessary, a color disappearing reaction caused by oxidation can be assisted. The mediator is not particularly limited as long as the mediator has such a function. It is favorable that the mediator be a copper (II) compound in terms of its chemically high stability. Examples of the copper (II) compound include $CuCl_2$, $CuSO_4$, $CuBr_2$, $Cu(NO_3)_2$, $Cu(COOH)_2$, and trifluoromethanesulfonic acid copper. Content of the mediator in the electrochromic elements is not particularly limited as long as a color disappearing reaction caused by oxidation can be assisted by an oxidant of the mediator giving and receiving electrons to/from silver whenever necessary. The content of the mediator in the electrochromic elements is adjusted as appropriate, according to a type of silver compound, etc. For example, when a 10 ml electrolyte solution is prepared, it is favorable that the content of the mediator be 0.001 mM to 10 mM, more preferably, 0.01 mM to 10 mM. Note that a concentration ratio of silver ions of the silver compound to copper (II) ions of the copper (II) compound is not particularly limited, but it is favorable that silver ions:copper (II) ions=about 10:1 to 10:3.

The solvent is not particularly limited as long as the solvent can stably hold the electrochromic material, the supporting electrolyte, and the mediator. Examples of the solvent include non-aqueous solvents such as dimethyl sulfoxide (hereinafter, also referred to as DMSO), N,N-dimethylformamide (hereinafter, also referred to as DMF), acetonitrile (hereinafter, also referred to as AN), propionitrile (hereinafter, also referred to as PN), n-butyronitrile, ethylene glycol, propylene glycol, acetone, ethanol, nitrobenzene, aniline, tetrahydrofuran, N-methylpyrrolidone, butanol, ethylene glycol monomethyl ether, diethylene glycol monomethyl ether, propylene glycol monomethyl ether, methyl ethyl ketone, methyl isobutyl ketone, xylene, toluene, butyl acetate, ethylene glycol acetate, dihydroterpinyl acetate, acetic acid, benzene, carbon tetrachloride, chloroform, N,N-dimethylacetamide, formamide, hexamethylphosphoramide, n-hexane, methanol, N-methylformamide, nitromethane, tetrahydrofuran, acrylonitrile, polyacrylonitrile, methacrylonitrile, benzonitrile, glycolonitrile, octanenitrile, and isobutyronitrile, which can be used alone or in a mixture of two or more kinds of the non-aqueous solvents.

Here, in the present disclosure, when a copper (II) compound is used as the mediator, a transparent image displayed by an obtained display device tends to become yellowish. Of the non-aqueous solvents, using DMSO is favorable in terms of compatibility with the electrochromic material, the supporting electrolyte, and the mediator. However, to obtain transmitted light which is nearly colorless and transparent, it is favorable to simultaneously use one or more kinds of non-aqueous solvents other than DMSO with DMSO, instead of using DMSO alone.

In addition, when one or more kinds of non-aqueous solvents other than DMSO are used simultaneously with DMSO, yellowness of a transparent image displayed can be reduced, but the transparent image may become reddish. Therefore, it is favorable to adjust, as appropriate, a kind of non-aqueous solvent to be used simultaneously with DMSO and a compounding ratio of the solvents so that both of the yellowness and redness of a transparent image can be reduced in a balanced manner.

The degrees of yellowness and redness of a transparent image are normally respectively represented by a b* value and an a* value (chromaticity represented by hue and saturation) in a L*a*b* color system. The L*a*b* color system is a common color system representing a color of an object. The L*a*b* color system is standardized by the International Commission on Illumination (CIE) (1976) and specified in JIS Z 8781-4: 2013 "Colorimetry—Part 4: CIE 1976 L*a*b* Colour Space". The a* and b*values are defined by the following equation using tristimulus values X, Y, and Z:

$$a^* = 500[f(X/X_n) - f(Y/Y_n)]$$

$$b^* = 200[f(Y/Y_n) - f(Z/Z_n)]$$

Note that
when $(X/X_n) > (6/29)^3$, $f(X/X_n) = (X/X_n)^{1/3}$
when $(X/X_n) \leq (6/29)^3$, $f(X/X_n) = (841/108)(X/X_n) + 4/29$
when $(Y/Y_n) > (6/29)^3$, $f(Y/Y_n) = (Y/Y_n)^{1/3}$
when $(Y/Y_n) \leq (6/29)^3$, $f(Y/Y_n) = (841/108)(Y/Y_n) + 4/29$
when $(Z/Z_n) > (6/29)^3$, $f(Z/Z_n) = (Z/Z_n)^{1/3}$
when $(Z/Z_n) \leq (6/29)^3$, $f(Z/Z_n) = (841/108)(Z/Z_n) + 4/29$ where
X, Y, and Z: Tristimulus values of test colour stimulus in the CIE 1931 color system specified in JIS Z 8781-1: 2013 "Colorimetry—Part 1: Colour-matching functions for the CIE Standard Colorimetric Observer", and
$X_n$, $Y_n$, and $Z_n$: Tristimulus values corresponding to a specific white stimulus.

Note that in practice it is sufficient that the a* and b* values of a transparent image be 5 or less and 16 or less, respectively, and it is favorable that the b*value be 3 or less.

In addition, since a freezing point of DMSO is as relatively high as about 18° C., considering practicality of a display device to be obtained, it is favorable to reduce a freezing point of the electrolyte solution by simultaneously using one or more kinds of non-aqueous solvents other than DMSO with DMSO. It is favorable that in practice the freezing point of the electrolyte solution be 0° C. or less, more preferably, −30° C. or less. Note that, as a common environmental testing method, ISO 60068 recommends testing where an operating environment is 0° C. or more and a storage environment is −20° C. or more, preferably, −30° C. or more. Thus, it is favorable that the freezing point of the electrolyte solution have a value that is allowed in such testing.

Furthermore, it is favorable to adjust, as appropriate, a kind of non-aqueous solvent to be used simultaneously with DMSO and a compounding ratio of the solvents, taking also into account an improvement of light reflectance for mirror switching, a switching speed between a state in which silver is deposited on an electrode by application of a voltage and a state in which silver ions are dissolved in the electrolyte solution by releasing the voltage, and an improvement of uniformity of each of the deposited state and dissolved state and an improvement of state maintenance characteristics (switching characteristics), in addition to a reduction in the yellowness of a transparent image displayed, prevention of occurrence of redness, and adjustment of the freezing point of a solvent to a level suitable for practical use which are described above.

From the above-described points, in the present disclosure, for example, solvents can be used in which other non-aqueous solvents are substituted for DMSO at ratios shown in the following tables 1 and 2.

TABLE 1

| Kind of non-aqueous solvent to be substituted | Amount of substitution relative to total amount of DMSO (weight %) | |
|---|---|---|
| | Favorable range | More favorable range |
| N,N-dimethylformamide | 10 to 50 | 20 to 40 |
| Acetonitrile | 5 to 50 | 15 to 35 |
| Propionitrile | 5 to 60 | 20 to 40 |
| Ethylene glycol | 5 to 50 | 15 to 25 |
| Propylene glycol | 5 to 50 | 15 to 25 |
| Acetone | 5 to 50 | 15 to 25 |
| Ethanol | 5 to 50 | 15 to 25 |
| n-butyronitrile | 5 to 50 | 15 to 25 |
| Nitrobenzene | 5 to 50 | 15 to 25 |
| Aniline | 5 to 50 | 15 to 25 |
| Tetrahydrofuran | 5 to 50 | 15 to 25 |
| N-methylpyrrolidone | 5 to 50 | 15 to 25 |
| Butanol | 5 to 50 | 15 to 25 |
| Ethylene glycol monomethyl ether | 5 to 50 | 15 to 25 |
| Diethylene glycol monomethyl ether | 5 to 50 | 15 to 25 |
| Propylene glycol monomethyl ether | 5 to 50 | 15 to 25 |
| Methyl ethyl ketone | 5 to 50 | 15 to 25 |
| Methyl isobutyl ketone | 5 to 50 | 15 to 25 |
| Xylene | 5 to 50 | 15 to 25 |

TABLE 1-continued

| Kind of non-aqueous solvent to be substituted | Amount of substitution relative to total amount of DMSO (weight %) | |
|---|---|---|
| | Favorable range | More favorable range |
| Toluene | 5 to 50 | 15 to 25 |
| Butyl acetate | 5 to 50 | 15 to 25 |
| Ethylene glycol acetate | 5 to 50 | 15 to 25 |
| Dihydroterpinyl acetate | 5 to 50 | 15 to 25 |

TABLE 2

| Kind of non-aqueous solvent to be substituted | Amount of substitution relative to total amount of DMSO (weight %) | |
|---|---|---|
| | Favorable range | More favorable range |
| Acetic acid | 5 to 50 | 15 to 25 |
| Benzene | 5 to 50 | 15 to 25 |
| Carbon tetrachloride | 5 to 50 | 15 to 25 |
| Chloroform | 5 to 50 | 15 to 25 |
| N,N-dimethylacetamide | 5 to 50 | 15 to 25 |
| Formamide | 5 to 50 | 15 to 25 |
| Hexamethylphosphoramide | 5 to 50 | 15 to 25 |
| n-hexane | 5 to 50 | 15 to 25 |
| Methanol | 5 to 50 | 15 to 25 |
| N-methylformamide | 5 to 50 | 15 to 25 |
| Nitromethane | 5 to 50 | 15 to 25 |
| Tetrahydrofuran | 5 to 50 | 15 to 25 |
| Acrylonitrile | 5 to 50 | 15 to 25 |
| Polyacrylonitrile | 5 to 50 | 15 to 25 |
| Methacrylonitrile | 5 to 50 | 15 to 25 |
| Benzonitrile | 5 to 50 | 15 to 25 |
| Glycolonitrile | 5 to 50 | 15 to 25 |
| Octanenitrile | 5 to 50 | 15 to 25 |
| Isobutyronitrile | 5 to 50 | 15 to 25 |

The gelling agent is a material that can improve memory performance of the electrochromic material. The gelling agent is not particularly limited as long as the gelling agent has such a function. However, it is favorable that the gelling agent be, for example, polyvinyl butyral (hereinafter, also referred to as PVB) or polyvinyl alcohol (hereinafter, also referred to as PVA), in terms of not involving in a silver oxidation-reduction reaction. Content of the gelling agent in the electrochromic elements is not particularly limited as long as the memory performance of the electrochromic material can be improved as described above. The content of the gelling agent in the electrochromic elements is adjusted as appropriate, according to a type of silver compound, etc. It is favorable that the content of the gelling agent be, for example, 1 weight % to 30 weight %, more preferably, 5 weight % to 20 weight %.

A method for preparing electrolyte solution 5 which serves as electrochromic elements is not particularly limited. An electrochromic material, a supporting electrolyte, a mediator, and a gelling agent whose types and compounding amounts are adjusted as appropriate are dissolved in a solvent whose type is adjusted as appropriate.

[2. Method for Manufacturing a Display Device]

A method for manufacturing a display device of the present disclosure is not particularly limited, either. The display device can be manufactured by, for example, the following method.

Two substrates each having an electrode are disposed in parallel to each other with a predetermined gap provided using spacers. Then, while lead-out portions that can apply voltages to the respective electrodes are fabricated, a periphery is sealed. A solution such as an electrolyte solution which serves as electrochromic elements is injected into the predetermined gap between the electrodes created by the sealing, and only an injection opening is sealed last. The injection opening may be provided at one location or at a plurality of locations.

Upon sealing, for example, by using a material in which beads with a diameter in a certain range are mixed in an ultraviolet-curable resin, the two substrates can be brought into a parallel state. The beads may be glass beads, ceramic beads, or the like. A material of the beads requires durability to solvents. Alternatively, without using beads, a piece of glass having a certain thickness may be cut into strips and the strips may be placed on the periphery as stoppers, and then the periphery may be sealed with a curable resin such as an ultraviolet curable resin, glass frit, etc.

When the display device performs drive for a display state and a mirror switching state, with a display surface or a back surface of the display device disposed oriented vertically upward, there is no particular change in the electrolyte solution. However, when the display surface or back surface of the display device is disposed in a horizontal direction or in a tilted position, in the electrolyte solution, due to differences in specific gravity of components, the components may be separated or a component with high specific gravity may settle, by which color of the display surface may vary or light transmittance and/or light reflectance may change locally. Hence, it is favorable to implement conditions where convection of the filled solution such as an electrolyte solution is less likely to occur, when the display device is used with the display surface or back surface of the display device disposed in the horizontal direction or in a tilted position.

For a method for making the convection of the filled solution such as an electrolyte solution difficult to occur, for example, there is a method for increasing a viscosity of an electrolyte solution by adjusting an amount of addition of a gelling agent. Specifically, a method can be employed in which an injection opening is provided at one location, an entire display device is brought into a vacuum state, and the injection opening is immersed in accumulation of a liquid agent placed in a vacuum. Thereafter, by slowly bringing the display device back to atmosphere, an electrolyte solution with a high viscosity is injected and sealing is performed. When there is a possibility that by bringing a container that contains a liquid agent into a vacuum state, a volatile component of the liquid agent transpires and accordingly a ratio of components in an electrolyte solution changes, a method can be employed in which after bringing a container into a vacuum state, a solvent is injected into liquid accumulation in the vacuum chamber, and then other components of an electrolyte solution are injected into the vacuum chamber. Furthermore, a plurality of holes may be made to remove bubbles occurring upon injection of an electrolyte solution and then sealing may be performed.

Figure 2:
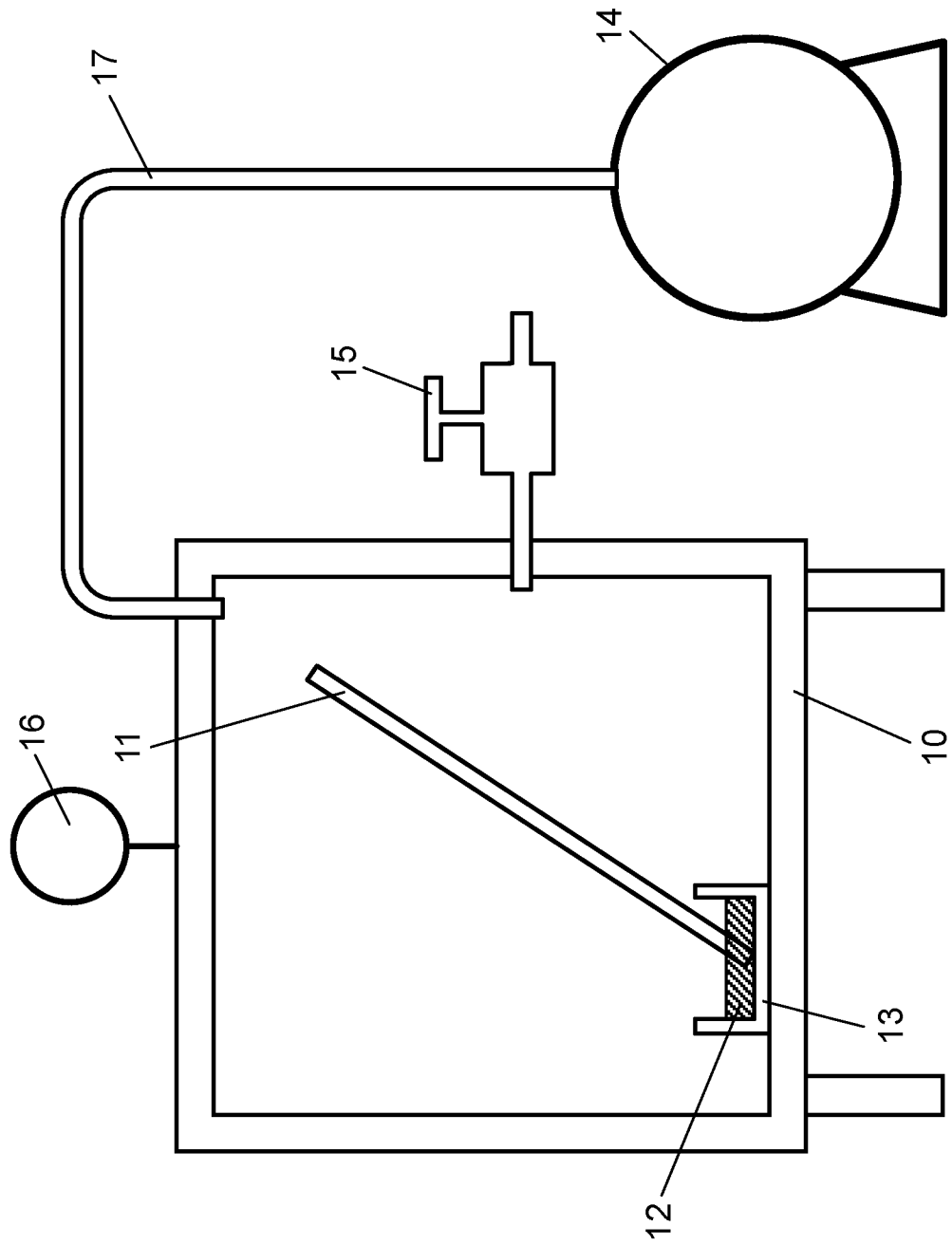
FIG. 2 is a schematic illustrative diagram showing an example of a vacuum injection system for an electrolyte solution which is used when a display device of the present disclosure is manufactured.
Figure 3:
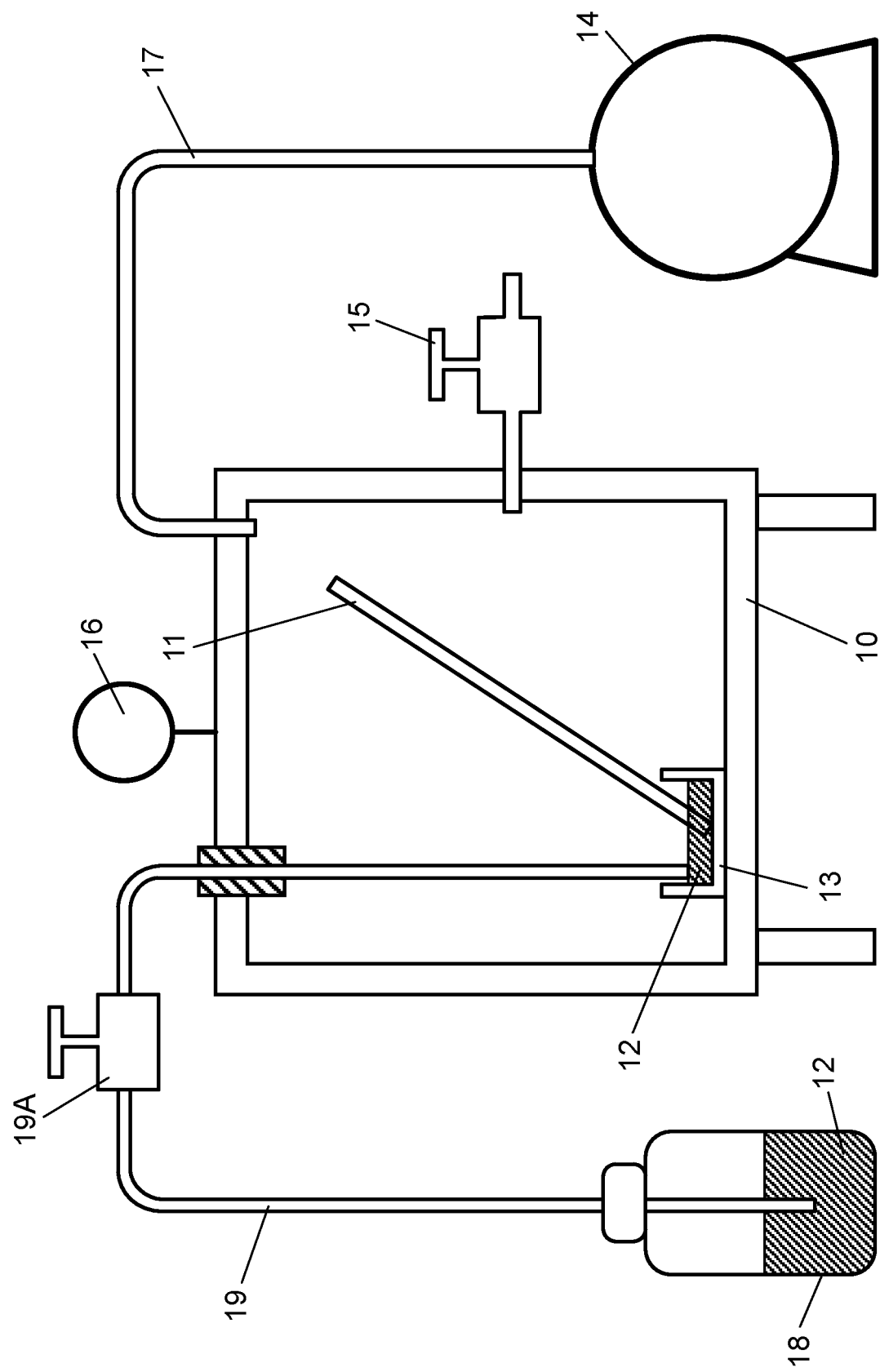
FIG. 3 a schematic illustrative diagram showing an example of a vacuum injection system for an electrolyte solution which is used when a display device of the present disclosure is manufactured.

Methods for injecting an electrolyte solution in a vacuum state are summarized below. FIGS. 2 and 3 are schematic illustrative diagrams showing examples of a vacuum injection system for an electrolyte solution. In a mode shown in FIG. 2, a container containing an electrolyte solution is set only in a vacuum chamber. In a mode shown in FIG. 3, a container containing an electrolyte solution is set in a vacuum chamber, and aside from this, a container containing an electrolyte solution is also set outside the vacuum chamber.

A vacuum injection system for an electrolyte solution shown in FIG. 2 is as follows:

(1) In vacuum chamber 10 is set container 13 that contains panel 11 having two substrates with electrodes which are disposed in parallel to each other with a predetermined gap (hereinafter, referred to as a panel), and electrolyte solution 12.

At this time, an electrolyte solution injection opening of panel 11 faces downward, and panel 11 is set to have a gap from liquid accumulation of electrolyte solution 12.

(2) An inside of vacuum chamber 10 is decompressed by vacuum pump 14.

It is confirmed that a degree of vacuum in vacuum chamber 10 is 10 Pa or less.

(3) Vacuum pump 14 is stopped.

Panel 11 is moved such that the electrolyte solution injection opening of panel 11 enters the liquid accumulation of electrolyte solution 12.

(4) Leak valve 15 is opened to slowly introduce atmosphere, by which a pressure inside vacuum chamber 10 increases with respect to vacuum inside panel 11. Then, by the pressure inside vacuum chamber 10 pressing a liquid surface of electrolyte solution 12, electrolyte solution 12 is injected into panel 11.

Vacuum chamber 10 has gage 16 for measuring the degree of vacuum. Vacuum chamber 10 is coupled to vacuum pump 14 by piping 17.

A vacuum injection system for an electrolyte solution shown in FIG. 3 is as follows:

(1) In vacuum chamber 10 is set container 13 that contains panel 11 and electrolyte solution 12. Separately, container 18 containing electrolyte solution 12 is set outside vacuum chamber 10. Container 13 for electrolyte solution 12 set in vacuum chamber 10 is connected to container 18 for electrolyte solution 12 set outside vacuum chamber 10 by tube 19 made of a fluorine resin.

(2) An inside of vacuum chamber 10 is decompressed by vacuum pump 14.

It is confirmed that a degree of vacuum in vacuum chamber 10 is 10 Pa or less.

(3) Valve 19A disposed on tube 19 is opened to introduce electrolyte solution 12 set outside vacuum chamber 10 into container 13 for electrolyte solution 12 set in vacuum chamber 10.

When electrolyte solution 12 of liquid accumulation in vacuum chamber 10 reaches an amount sufficient for an amount to be filled in panel 11, valve 19A of tube 19 is closed.

(4) Vacuum pump 14 is stopped.

(5) Leak valve 15 is opened to slowly introduce atmosphere, by which a pressure inside vacuum chamber 10 increases with respect to vacuum inside panel 11. Then, by the pressure inside vacuum chamber 10 pressing a liquid surface of electrolyte solution 12, electrolyte solution 12 is injected into panel 11.

Note that it is favorable to employ the vacuum injection system for an electrolyte solution shown in FIG. 3, when, as described above, there is a possibility that a volatile component of a liquid agent transpires and accordingly a ratio of components in an electrolyte solution changes.

In addition, when an electrolyte solution is injected into a panel, bubbles of the electrolyte solution may occur. If the bubbles remain, then some inconvenience may occur in display. As measures against this, injection openings may be provided at a plurality of locations to solve such a problem. Specifically, for example, in a case of the vacuum injection systems of FIGS. 2 and 3, an injection opening that does not enter liquid accumulation of an electrolyte solution is closed with a tape or the like, and steps up to the injection of an electrolyte solution are performed. Then, after an inside of a vacuum chamber is brought back to atmospheric pressure, the tape or the like closing the injection opening is removed, and air bubbles may be released through the injection opening from which the tape or the like is removed, and/or addition of an electrolyte solution may be performed. The addition of an electrolyte solution may use a dispenser, a syringe, or the like. Note that it is favorable to provide injection openings such that a straight line connecting injection openings of a panel provided at a plurality of locations intersects a virtual line segment that passes through a center of the panel and that divides the panel into two parts. For example, in a case of a substantially rectangular panel, an injection opening may be provided to each of facing sides.

[3. Lead-Out Lines from a Display Device]

For example, in a display device manufactured by the above-described method, a part of an electrode connected to each of facing electrodes by a conductive material is placed outside a sealed sealing material, and establishes a connection with a drive circuit which will be described later. At this time, since drive of the display device uses capacitance load instead of common resistance load, a resistance value to electrode surfaces exerts a great influence as load of the drive circuit. The electrode surfaces face each other with a solution, such as an electrolyte solution which serves as actual capacitance, sandwiched between the electrode surfaces.

The resistance value is mainly broken into resistance of an electrode itself (sheet resistance), wiring resistance, contact resistance, ON resistance of the drive circuit, etc. In a case of a transparent electrode, it is difficult to extremely reduce the resistance of an electrode itself, and a method is considered in which the resistance is reduced by a combination with a metal line, etc. In this case, when the display device is in, particularly, a transparent state, the metal line is easily visually recognized. Thus, it is favorable to make the metal line difficult to be visually recognized by, for example, using a thinnest possible metal line. In addition, since a current flows through a substrate electrode on a front surface side and a substrate electrode on a back surface side through the electrolyte solution, a metal line may be placed on either substrate electrode so that the metal line is not noticeable. In this case, taking into account when the display device is switched to a mirror state, a metal line may be placed only on the substrate electrode on the back surface side. The metal line can use, for example, aluminum, silver, gold, copper, or chromium that has a high conductivity. In addition, to keep resistance as small as possible, instead of a metal line, a region of a transparent electrode that has a large film thickness may be fabricated.

Furthermore, a metal such as silver, aluminum, or a chromium that has a high conductivity and has subtle color may be formed into a thin film, and the thin film may be placed under a transparent electrode to suppress a voltage drop caused by in-plane resistance, by which in-plane uniformity may be increased. In this case, when a film thickness of the metal thin film increases, light transmittance may drastically decrease. Thus, it is favorable that the film thickness of the metal thin film be about 100 nm or less. Note that the use of a metal line on either or both of the substrate electrode on the front surface side and the substrate electrode on the back surface side and the placement of a metal thin film may be combined or may not be combined. When the metal line and the metal thin film are used, it is favorable to place the metal line and the metal thin film under a transparent electrode. By placing the metal line and the metal thin film under the transparent electrode, it is possible to eliminate a possibility that the metal is contaminated or dissolved by a solution such as an electrolyte solution containing a mediator such as $CuCl_2$, by which on operation of the solution is affected.

Since extraction of an electrode from a periphery of the display device is also greatly influenced by contact resistance, it is favorable to reduce the contact resistance. Namely, it is favorable to press a transparent electrode by spring force of a clip, etc. For example, it is favorable to press at a linear pressure of about 3 N/m or more, more preferably, about 5 N/m or more. Furthermore, in an extraction electrode portion, by placing a metal thin film (metal electrode) on a transparent electrode, an effect of reducing the contact resistance can be expected. At this time, it is favorable to use a metal with a low contact resistance, e.g., gold. It is favorable that an area of an extraction electrode be as large as possible. For the display device, it is ideal that a frame be small in terms of design of the display device, etc. Thus, it is favorable to establish a connection at a longest possible distance in a direction in which a mirror and a transmission surface of the display device go along. Since two electrodes are extracted from two substrates, electrodes of respective polarities may be extracted from two directions out of four directions to increase a distance between the electrodes.

Figure 4:
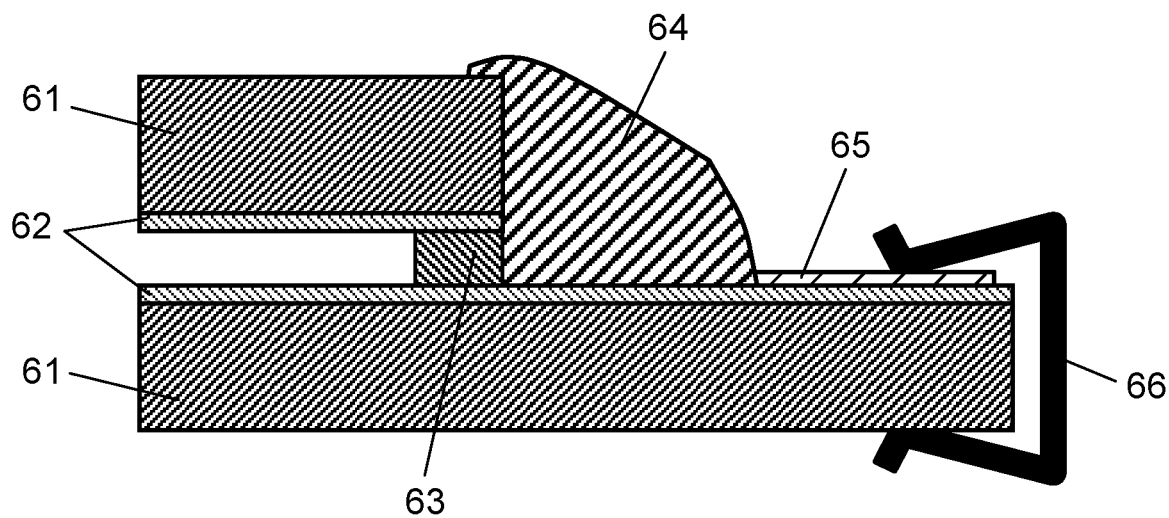
FIG. 4 is a schematic cross-sectional view showing an example of a display device of the present disclosure and an extraction electrode portion of the display device.
Figure 5:
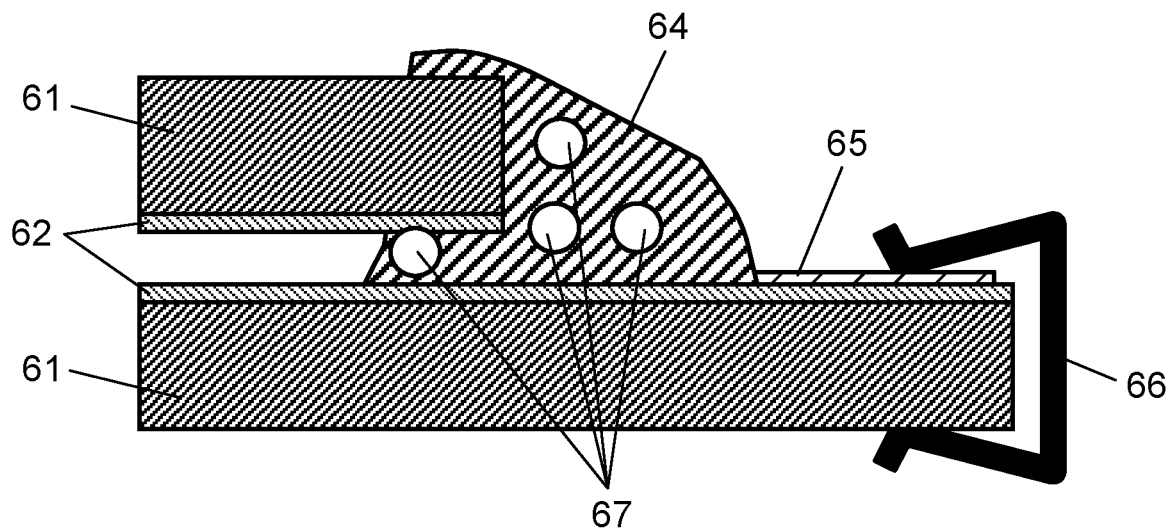
FIG. 5 is a schematic cross-sectional view showing an example of a display device of the present disclosure and an extraction electrode portion of the display device.
Figure 6:
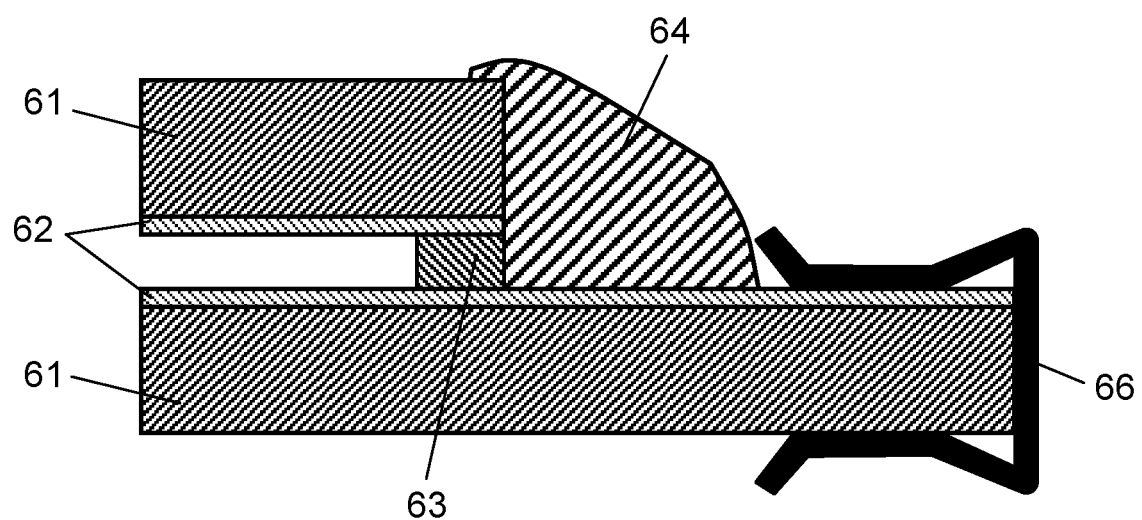
FIG. 6 is a schematic cross-sectional view showing an example of a display device of the present disclosure and an extraction electrode portion of the display device.

Schematic cross-sectional views of FIGS. 4 to 6 show examples of a display device and an extraction electrode portion of the display device which are described in [2. Method for manufacturing a display device] and [3. Lead-out line from a display device]. In FIGS. 4 to 6, a pair of facing substrates 61 has transparent electrodes 62.

In an example shown in FIG. 4, a gap between the pair of transparent electrodes 62 is maintained by plate-like spacer 63. An edge portion of substrates 61 is sealed by sealing material 64. In addition, transparent electrode 62 has metal electrode 65 at an edge portion, and by pressing clip-like jig 66 against metal electrode 65 at a pressure of a certain level or more, a line is electrically led out from metal electrode 65.

In an example shown in FIG. 5, a gap between the pair of transparent electrodes 62 is maintained by disposing beads 67 in a sealing region and performing sealing with sealing material 64. Beads 67 may be mixed in sealing material 64 in advance. A configuration of electrically leading out a line from metal electrode 65 is the same as the configuration in the example shown in FIG. 4.

On the other hand, like an example shown in FIG. 6, a clip-like jig that contacts a transparent electrode at a certain pressure can contact the transparent electrode linearly instead of a point viewed from a cross section. Namely, when the transparent electrode and the clip-like jig can contact each other in a planar manner at a certain pressure, contact resistance can be reduced without leading out a lead-out line from a metal electrode. Note that at this time the clip-like jig has conductivity, and a lead-out line may be led out from the clip-like jig. Although in the example shown in FIG. 6 a pair of substrates are made parallel to each other using a plate-like spacer, other methods may be employed such as a method using beads.

Figure 7:
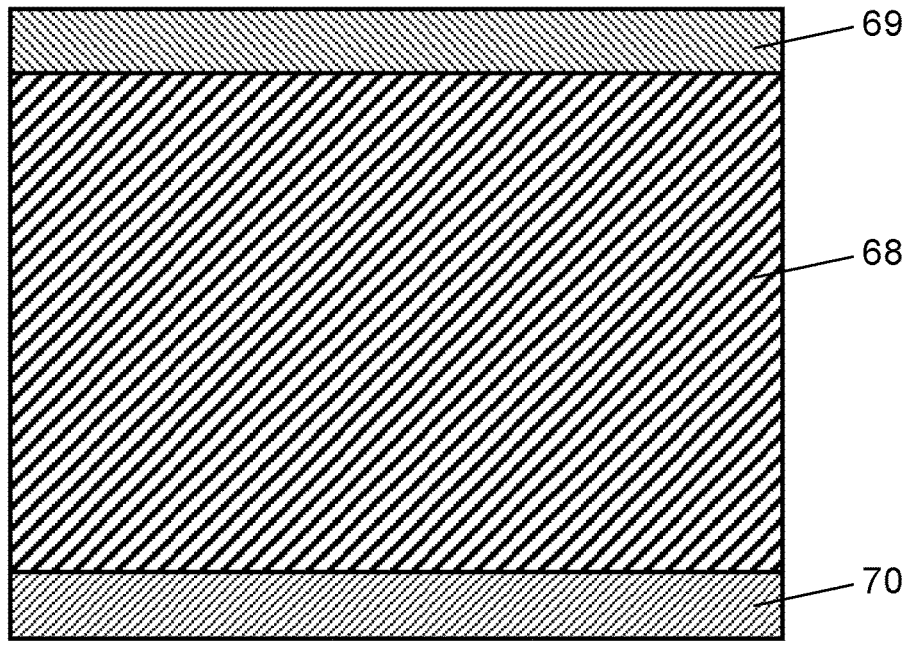
FIG. 7 is a schematic diagram showing disposition of electrode extraction portions and electrochromic elements of a display device of the present disclosure.
Figure 8:
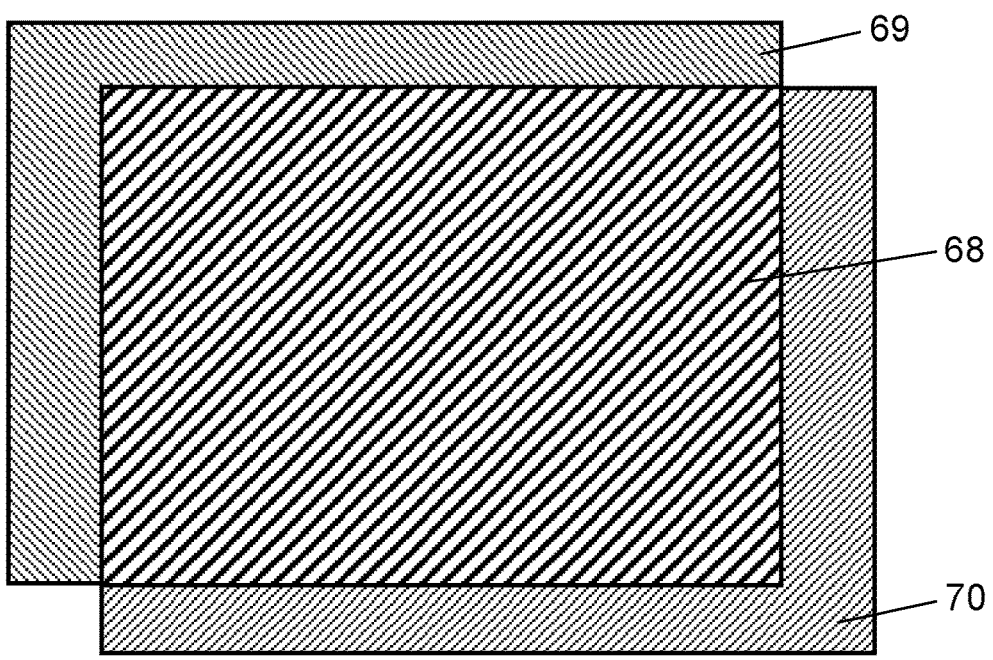
FIG. 8 is a schematic diagram showing disposition of electrode extraction portions and electrochromic elements of a display device of the present disclosure.

FIGS. 7 and 8 are schematic diagrams showing disposition of electrode extraction portions and electrochromic elements (referred to as an EC panel portion) of a display device. In FIGS. 7 and 8, at a peripheral portion of EC panel there are disposed electrode extraction portion 69 on a front surface side and electrode extraction portion 70 on a back surface side. As shown in FIGS. 7 and 8, in a mode shown in FIG. 8, areas of electrode extraction portions 69, 70 are larger than in a mode shown in FIG. 7.

[4. Method for Driving a Display Device]

Next, a method for driving a display device of the present disclosure will be described.

Figure 9:
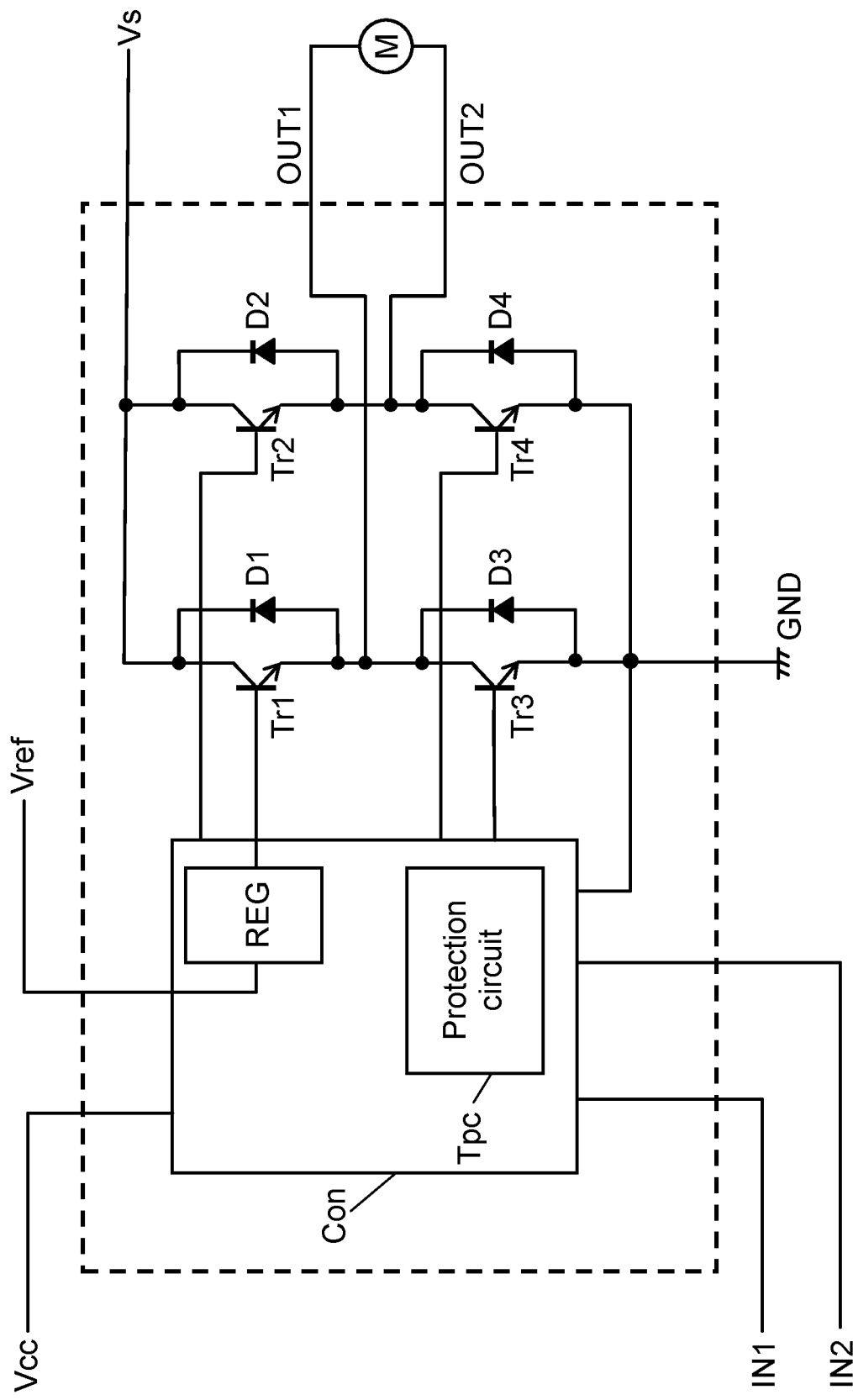
FIG. 9 is a schematic illustrative diagram showing an example of a drive circuit used when the display device according to the first exemplary embodiment is driven.
Figure 10:
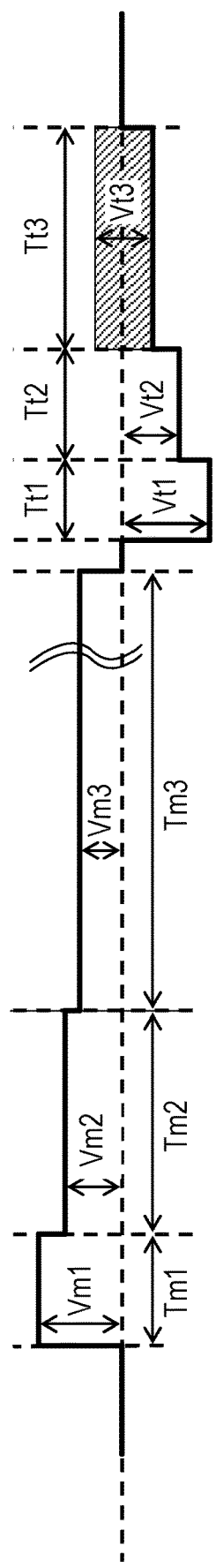
FIG. 10 is a schematic diagram showing an example of a voltage waveform of voltages applied by the drive circuit of FIG. 9.

FIG. 9 is a schematic illustrative diagram showing an example of a drive circuit used when the display device according to the first exemplary embodiment is driven, and voltages are applied to electrochromic elements from electrodes facing each other. In addition, FIG. 10 is a schematic diagram showing an example of a voltage waveform of voltages applied by the drive circuit.

Here, glass substrates are used as substrates, and ITO is used as a material of the electrodes. By uniformly depositing ITO on the glass substrates, the substrates with electrodes are obtained. The substrates are allowed to face each other. Note that description is made of a case in which a distance between the two substrates (electrodes) is 500 μm. An electrolyte solution which serves as the electrochromic elements contains a silver compound ($AgNO_3$) which is an electrochromic material, a copper (II) compound ($CuCl_2$) which is a mediator, DMSO and AN (DMSO:AN (weight ratio)=80:20) which are solvents, and the like.

In the drive circuit of FIG. 9, control circuit Con composed of a semiconductor element performs switching control using control signals IN1, IN2 which are input from an external source, by which DC power supply voltage Vcc can be supplied to a LOW-side circuit and a HIGH-side circuit in a switching manner. For the HIGH-side circuit, regulator REG changes DC power supply voltage Vcc to a voltage between DC power supply voltage Vcc and a LOW-side GND potential (0 V), and the voltage can be output through Vs. Control circuit Con includes protection circuit Tpc.

In FIG. 9, the LOW-side GND potential is set to 0 V but does not need to be 0 V, depending on an external environment of electrochromic elements D1, D2, D3, D4. In addition, transistors Tr1, Tr2, Tr3 and Tr4 serve as switching elements that are connected to a HIGH side and/or a LOW side. By two of transistors Tr1, Tr2, Tr3 and Tr4 going into an ON state, a through current flows through the two transistors from DC power supply voltage Vcc at a low resistance. Thus, it is favorable to provide a period during which two transistors go into an OFF state, upon switching so that the two transistors do not go into an ON state. Furthermore, by bringing potentials of two transistors into a flow state, i.e., by leaving the two transistors in an OFF state, the transistors can be used as a means of gently adjusting charges of corresponding electrochromic elements in the display device.

First, a method for depositing silver on one electrode from electrochromic elements will be described.

Here, for example, deposition may be performed such that a potential of an electrode on which silver is to be deposited is set to a GND potential (0 V) and a positive potential is applied to the other facing electrode, or without setting the potential of the electrode on which silver is to be deposited to a GND potential (0 V), a negative potential may be relatively applied to the other facing electrode. Of course, the potential of the other facing electrode may be set to a GND potential (0 V) or a set potential, and a negative potential may be applied to the electrode on which silver is to be deposited. At this time, DC power supply voltage Vcc requires a DC power supply that provides negative values, and thus, transistors, diodes, etc., of FIG. 9 also need to be changed to transistors, diodes, etc., having opposite polarity. In addition, it is also possible to use an element that can even change polarity using a regulator. When an alternating voltage with a GND potential (0V) in between is applied, it is favorable to use such an element.

Next, description is made of changes in applied voltage for a mirror state (for mirror switching), i.e., when silver deposition is promoted. As shown in FIG. 10, here, a voltage is divided into three levels and applied, which are referred to as a nucleation voltage (Vm1), a nuclear growth voltage (Vm2), and a mirror sustain voltage (Vm3), respectively. In addition, periods during which the respective voltages are applied are referred to as a nucleation period (Tm1), a nuclear growth period (Tm2), and a mirror maintenance period (Tm3).

The nucleation voltage is a voltage required to perform deposition on an electrode surface, i.e., here, to generate nuclei of metal crystals of silver. Since a silver ion is electrophoresed according to an electric field in a solution such as an electrolyte solution, and becomes a nucleus when the silver ion reaches the electrode surface, the silver ion needs to collide with an electrode at energy of a certain level or more. Thus, the nucleation voltage requires a bit high potential difference. On the other hand, by continuously applying a potential that enables generation of nuclei, an impact may be applied to a thin film formed on an electrode film surface, by which the thin film may be peeled off. Hence, it is favorable that the application of the nucleation voltage be completed in a relatively short period of time, within 2 seconds at the maximum. Note that application time and a magnitude of applied voltage of the nucleation voltage often vary depending on design matters such as a distance between the electrodes of the display device, and thus, it is favorable to determine the application time and the magnitude of applied voltage according to a relationship as will be described later.

Figure 11:
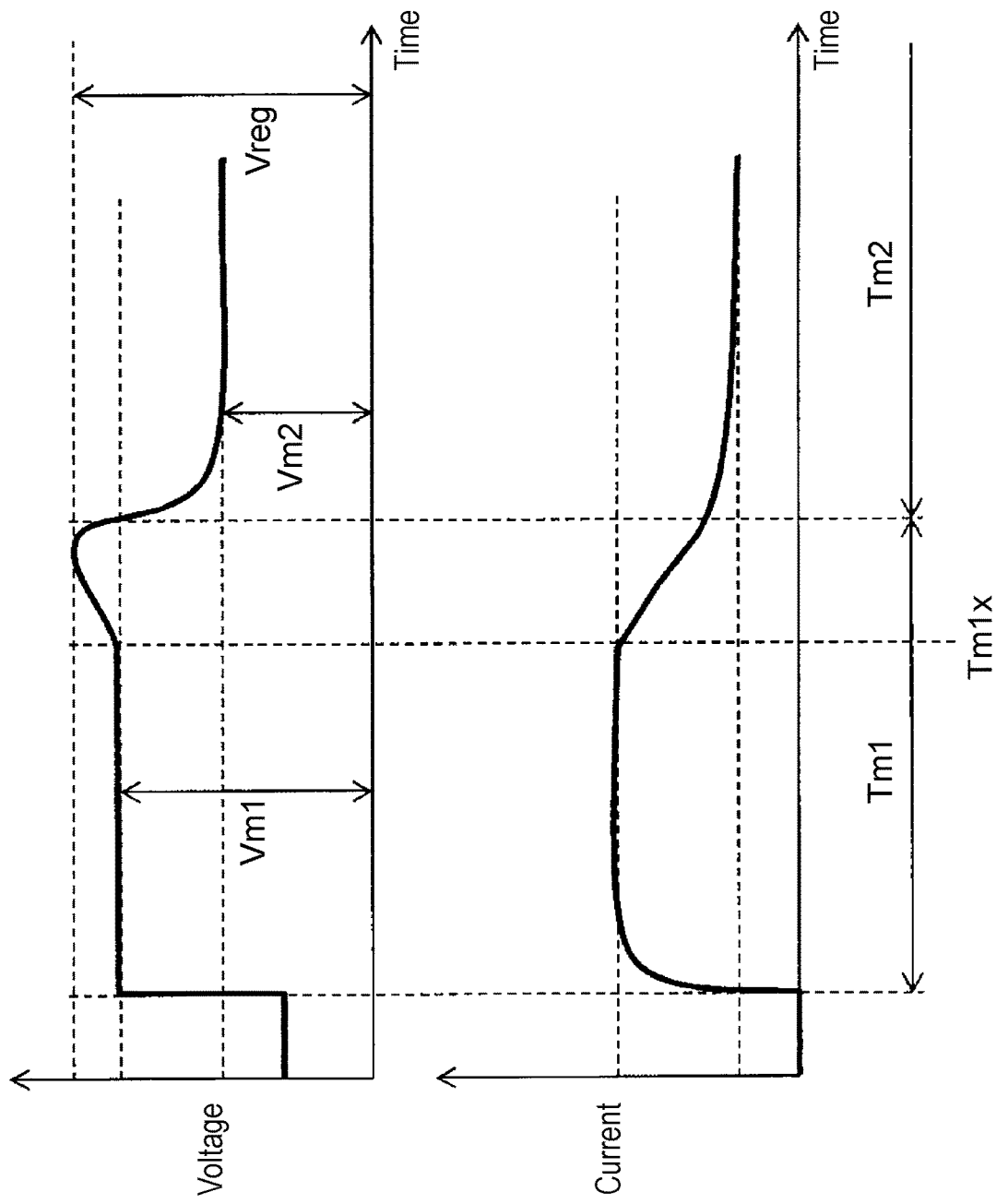
FIG. 11 is a graph showing a relationship between voltage and current for a nucleation period.

When a configuration, etc., of a display device are generalized, a relationship between voltage and current for the nucleation period is as shown in FIG. 11. Note that values of these voltage and current are measured at a location of a lead-out electrode of the display device. Even if a constant voltage is applied, in practice due to power consumed during the nucleation period, a voltage near the electrode is lower than voltage Vreg which is specified by a regulator. This voltage difference can be reduced by, for example, increasing capacitance of a drive circuit. In addition, by an increase in capacitance of the display device, e.g., an increase in display area, the voltage difference reversely tends to increase.

During the nucleation period, an electrode surface on which a silver is to be deposited requires high energy as described above until silver deposition covers substantially the entire electrode surface. Thus, there is a tendency that the current is also large and the voltage drops a bit lower than a specified value. On the other hand, if nucleation is further continued even after passing a period during which silver deposition covers substantially the entire electrode surface, unlike the electrode surface, nuclei are further formed in a region where nuclei are already formed, and/or the nuclei go into a growth phase. This corresponds to time Tm1x in FIG. 11. An amount of nuclei generated is largely related to an integral value of current from a time when drive from a transparent state to a mirror state starts. Thus, even if the current is increased by increasing the specified voltage, the same characteristics as characteristics obtained before increasing the specified voltage are exhibited, except for an effect of reducing time.

Note that when a reduction in time is achieved by increasing the voltage, it is favorable to note the following two points. A first point is that the electrolyte solution may be decomposed, and a second point is that it becomes difficult to determine the nucleation period having a margin.

For the decomposition of the electrolyte solution, by application of an excess voltage, irreversible changes may occur in the electrolyte solution, such as a change in color of the electrolyte solution and a change in deposition state. For information, in sequences (Sc) 1 to 4 in table 5 which will be described later, such phenomena may occur by application of about 6 V or more. Namely, it is favorable to avoid application of an electric field of about 12 V/mm or more to the electrolyte solution.

For the determination of the nucleation period, by applying the nucleation voltage for a long period of time until nuclear growth, malfunctions may occur, such as it takes time to achieve transparency, or non-uniform transparency occurs in a plane. In addition, when the nucleation period is too short, mirror quality may degrade, such as light reflectance for a mirror state becomes non-uniform in a plane. Hence, the nucleation period (Tm1) is set to be long so as to include time Tm1x during the period. Moreover, it is favorable to minimize a difference between a time when the nucleation period (Tm1) ends and time Tm1x. When drive of a display device of the present disclosure is performed in practice, the nucleation period (Tm1) is not determined precisely due to factors such as individual differences between display devices, and thus, the drive is performed having a certain margin. However, when the voltage is high, nucleation is completed in a very short period of time and accordingly a speed of nuclear growth after the nucleation also increases, resulting in a small margin. Hence, it is favorable to determine the nucleation voltage and the nucleation period, taking into account these conditions. Note that, when a metal to be deposited is other than silver, too, though an absolute value of the voltage is different, the same tendency is exhibited, and thus, conditions may be set by the same method.

In addition, in a case in which a constant applied voltage (nucleation voltage: Vm1) is being applied during the nucleation period (Tm1), when it is detected that the applied voltage has risen from the nucleation voltage (Vm1), it may be determined that time Tm1x has reached, and thus, the applied voltage may be changed to the nuclear growth voltage (Vm2).

Next, the nuclear growth voltage is applied to grow the nuclei. Since the nuclei which serve as a metal film are already formed on the electrode surface and energy required for crystallization is relatively low, the nuclear growth voltage is normally lower than the nucleation voltage. Note that since the nuclei grow into a film, if the nuclear growth voltage is continuously applied over a long period of time, a film thickness increases and film peeling tends to occur due to internal stress. Hence, it is favorable that application of the nuclear growth voltage also be completed within a certain period of time. Note that application time and a magnitude of applied voltage of the nuclear growth voltage also often vary depending on design matters such as a distance between the electrodes of the display device, and thus, it is favorable to determine the application time and the magnitude of applied voltage according to the relationship as will be described later.

Next, the mirror sustain voltage (mirror sustain pulse voltage) will be described. In a display device described here, an electrolyte solution which serves as electrochromic elements contains $CuCl_2$ as a mediator, and the thin film of silver formed on the electrode is always dissolved from the electrode surface by the $CuCl_2$, according to a solubility product. The voltage is applied such that silver is deposited at a rate higher than or equal to a rate at which the thin film of silver is dissolved by the $CuCl_2$. If the application of the voltage is terminated, the silver dissolving rate becomes higher than the deposition rate, and thus, the film thickness of the thin film of silver decreases. As a result, there is a tendency that light reflectance of the electrochromic elements decreases and light transmittance increases. On the other hand, as described above, when the applied voltage is large and the silver deposition rate is higher than the dissolving rate, though it depends on a film growth rate, the film thickness continuously increases and thus film peeling tends to occur. Therefore, when a balanced relationship is maintained between the deposition rate and dissolving rate of silver, stable mirror maintenance is possible.

However, it is very difficult to apply a voltage at a certain point where the deposition rate and dissolving rate of silver achieve a balanced state, in terms of also individual differences between display devices. Thus, normally, a voltage at which a substantially balanced state is achieved is set at a center, and a voltage at which the deposition rate is a bit higher than the deposition rate of the voltage at which the balanced state is achieved and a voltage at which the dissolving rate is a bit higher than the dissolving rate of the voltage at which the balanced state is achieved are applied alternately, the voltages having, for example, a rectangular wave, substantially rectangular wave, or sine wave form. By this, even if a balanced state which is assumed in advance includes some error, since total deposition time and/or dissolving time are repeated, a mirror state can be maintained over a relatively long period of time.

From the above, the following table 3 shows favorable ranges for magnitudes of the nucleation voltage, the nuclear growth voltage, and the mirror sustain voltage, and the nucleation period, the nuclear growth period, and the mirror maintenance period, for when a display device with an electro-to-electrode distance of 500 µm is driven. By thus adjusting the magnitudes of the voltages and the periods, a mirror state can be stably maintained over a long period of time.

TABLE 3

|  | Voltage (V) | Period (seconds) |
| --- | --- | --- |
| Nucleation | 2.6 to 6.0 | 0.7 to 2.0 |
| Nuclear growth | 1.5 to 2.6 | 10.0 to 40.0 |
| Mirror maintenance | 0 to 2.6 | (any) |

Next, description is made of changes in applied voltage for a transparent state (for display), i.e., when dissolving of silver is promoted. As shown in FIG. 10, here, too, a voltage is divided into three levels and applied, which are referred to as transparency voltage 1 (Vt1), transparency voltage 2 (Vt2), and transparency voltage 3 (Vt3), respectively. In addition, periods during which the respective voltages are applied are referred to as transparency period 1 (Tt1), transparency period 2 (Tt2), and transparency period 3 (Tt3).

When the display device is brought into a transparent state from a mirror state by increasing light transmittance, the silver deposited on the electrode is allowed to be dissolved. The deposited silver is gradually dissolved even in a no-voltage application state due to an action of $CuCl_2$ contained in the electrolyte solution in the display device, and changes into a transparent state. However, in this case, a relatively long period of time is required and thus it is not appropriate to apply the display device to an application that requires a change in a short period. In addition, a method is also considered in which the dissolving rate is increased by applying a voltage of opposite polarity to cause the deposited silver to perform electrophoresis in an opposite direction. However, silver is deposited on the other electrode, resulting in that the light transmittance tends not to increase.

From these points, as a voltage of opposite polarity, transparency voltage 1 which is smaller than the nucleation voltage is applied to the other electrode first, and then transparency voltage 2 and transparency voltage 3 are applied to sequentially reduce the applied voltage. This can significantly reduce changing time from a mirror state to a transparent state which requires, for example, several tens of minutes conventionally. Note that, as shown in FIG. 10, transparency voltage 2 and transparency voltage 3 may be the same voltage. In addition, as with the mirror switching, at the last stage of voltage application, i.e., transparency period 3, silver attempts to be deposited on the other electrode and thus goes into a state of polarization around the electrode (a state in which silver is not deposited but gather around the electrode in a silver ion state). In this state, by applying a voltage with polarity being alternated, a period of time during which silver ions are electrophoresed in the electrolyte solution increases, and a probability of collision between deposited silver and the electrolyte solution increases, enabling to further promote transparency.

From the above, following table 4 shows favorable ranges for magnitudes of transparency voltage 1, transparency voltage 2, and transparency voltage 3, and transparency period 1, transparency period 2, and transparency period 3, for when a display device with an electro-to-electrode distance of 500 µm is driven. By thus adjusting the magnitudes of the voltages and the periods, a speed of switching from a mirror state to a transparent state can be increased.

TABLE 4

|  | Voltage (V) | Period (seconds) |
| --- | --- | --- |
| Transparency 1 | 0.5 to 2.0 | 0.5 to 10.0 |
| Transparency 2 | 0.3 to 1.0 | 10.0 to 300.0 |
| Transparency 3 | −0.6 to 0.6 | (any) |

In addition, description is made of examples of a case in which a mirror state and a transparent state are implemented by changing conditions such as a drive sequence and an applied voltage, which are shown in following table 5.

TABLE 5

| Details of control | | | Sequence | | | | | | |
| --- | --- | --- | --- | --- | --- | --- | --- | --- | --- |
|  |  |  | Sc1 | Sc2 | Sc3 | Sc4 | Sc5 | Sc6 | Sc7 |
| Mirror state | Nucleation | Vm1(V) | 4.0 | 4.0 | 4.0 | 4.3 | 5.0 | 5.0 | 3.6 |
|  |  | Tm1(seconds) | 1.1 | 1.1 | 1.1 | 1.4 | 1.2 | 1.4 | 1.4 |
|  | Nuclear growth | Vm2(V) | 2.45 | 2.45 | 2.45 | 2.45 | 2.60 | 2.60 | 2.60 |
|  |  | Tm2(seconds) | 12 | 12 | 12 | 12 | 30 | 21 | 21 |
|  | Mirror maintenance | Vm3(V) | 1.43 | 1.43 | 1.43 | 1.55 | 1.65 | 1.60 | 1.60 |

TABLE 5-continued

| | Details of control | | Sc1 | Sc2 | Sc3 | Sc4 | Sc5 | Sc6 | Sc7 |
|---|---|---|---|---|---|---|---|---|---|
| Transparent state | Transparency 1 | Vt1(V) | −1.0 | −1.0 | −0.6 | −0.6 | −0.6 | −0.6 | −0.6 |
| | | Tt1(seconds) | 1 | 1 | 60 | 120 | 60 | 120 | 120 |
| | Transparency 2 | Vt2(V) | −0.6 | −0.6 | −0.1 | −0.1 | −0.1 | −0.1 | −0.1 |
| | | Tt2(seconds) | 60 | 120 | 120 | 120 | 120 | 120 | 120 |
| | Transparency 3 | Vt3(V) | ±0.6 | ±0.6 | ±0.1 | ±0.1 | ±0.1 | ±0.1 | ±0.1 |
| Mirror state (after continuous five minutes) | Light reflectance (%) | | 67 | 66 | 64 | 70≤ | 68 | 70≤ | 70≤ |
| | Light transmittance (%) | | 2 | 3 | 4 | 1≥ | 5 | 1≥ | 1≥ |

Sequences (Sc) 1 and 2 are optimal examples where a high-quality mirror state and a high-quality transparent state can be implemented appropriately. Here, time required for change is within several minutes which is an appropriate range. In addition, many viewers can actually feel that the display device has gone into a mirror state or a transparent state. Criteria of determination of pass/fail are set as follows: the display device can achieve a light reflectance of 65% or more for the mirror state, or a light transmittance of 70% or more and a light reflectance of 20% or less for the transparent state. The light reflectance and the light transmittance are ratios of the electrochromic elements obtained at a central wavelength of a visible spectrum.

Sc3 is an example of a sequence intended to maintain a mirror state over a long period of time. Sc4 is an example of a sequence intended to improve light reflectance for a mirror state. Sc5 is an example of a sequence intended to reduce switching time to a mirror state. Sc6 is an example of a sequence intended to implement, in a short time, a mirror state where light reflectance is 70% or more which is substantially close to a normal specular surface. Sc7 is an example of an optimal sequence for bringing the display device into a mirror state when an electrolyte solution containing solvents DMSO:AN (weight ratio)=50:50 is used.

As such, it can be seen that it is favorable to change, when the display device is brought into a mirror state, the sequence and the applied voltage according to the purpose of the mirror state. Note that Sc3 to Sc7 are sequences intended to securely bring the display device into a mirror state without particularly considering a transparent state. When the light reflectance exceeds 70% such as Sc4 and Sc6, switching to a transparent state requires a certain amount of time. However, when sequences taking also into account a transparent state such as Sc1 and Sc2 are used, a formed silver thin film may be locally peeled off, and thus, the sequences such as Sc4 and Sc6 are selected.

As described above, a display device of the present disclosure has appropriate sequences that vary according to a purpose of use of the display device. It is favorable to employ a drive method according to the purpose.

The above-described drive methods and applied voltages are intended to repeat a change between a mirror state and a transparent state at a high speed, and when the nucleation voltage (Vm1) is used as described above, electrochromic element life may be reduced. Hence, for example, when DMSO is used as a solvent and TBABr is used as a supporting salt, the applied voltage is set to about 3.7 V or less which is a standard potential difference between DMSO and TBABr, more preferably, 2.6 V or less which is a standard potential of DMSO, by which the electrochromic element life can be increased. Likewise, when the solvent and the supporting salt are changed to other materials, too, it is desirable to set a desirable applied voltage within a standard potential difference between the solvent and the supporting salt, more preferably, less than or equal to a standard potential of the solvent.

[5. Division of Electrodes]

Although, for example, in display device 1 shown in FIG. 1, electrodes 31, 32 are placed all over substrates, 21, 22, respectively, in a display device of the present disclosure electrodes may be divided into some regions.

By optimizing a voltage to be applied to each of the divided regions, variation between a peripheral potential and a central potential is reduced. Then, it becomes possible to suppress occurrence of variation in change in light transmittance and light reflectance. Specifically, for example, drive may be performed on a region-by-region basis by time allocation between scanning and writing which is performed by a liquid crystal display. In addition, lead-out may be performed from each region using a corresponding lead-out line, and a voltage may be applied parallelly and individually on a region-by-region basis. Furthermore, only one electrode may be divided, or division may be performed such that corresponding regions of two electrodes have the same shape. When only one electrode is divided, it is favorable to divide an electrode that is located on a back surface side from a viewer, in terms of that it becomes difficult for the viewer to visually recognize the division.

[6. Light Reflectance Adjustment Function]

In a display device according to the present disclosure, as will be described later, light reflectance of electrochromic elements for a mirror state at a central wavelength of a visible spectrum is 65% or more. However, by controlling a magnitude and application time of a voltage for when the display device is brought into a mirror state, the display device can also be stabilized as a mirror with reduced light reflectance. For example, by setting a lower nuclear growth voltage than a normal nuclear growth voltage, e.g., about 0.3 V to 1.5 V, or by setting shorter application time of the nuclear growth voltage than normal application time, e.g., about 10 seconds to 20 seconds, or by changing both of these conditions, the display device can also be used as a mirror with a light reflectance of about 20% to 30%. Note that by further reducing the application time of the nuclear growth voltage, a further reduction in light reflectance can also be achieved. In addition, by reducing the mirror sustain voltage, too, an increase in light reflectance becomes very gentle. For example, by setting the mirror sustain voltage to about 0 V to 1.5 V during a mirror maintenance period within about one hour, it is also possible to reduce light reflectance for mirror switching. Furthermore, by changing the conditions as appropriate, it is also possible to achieve light reflectance between a high light reflectance of 65% or more, furthermore, 70% or more, and a low light reflectance of about 20% to 30%.

For example, when ambient light is bright upon mirror switching, the light reflectance is reduced, by which dazzle can be reduced. Reversely, when ambient light is dark and it is difficult to see the mirror, the light reflectance is increased, by which a clear mirror can be obtained. On the other hand, even when ambient light is dark, if there is a luminous object, etc., in an area of reflection in the mirror, to avoid human eyes from being dazzled by the luminous object, etc., the light reflectance may be set to about 20% to 30%. Such an adjustment of light reflectance may be performed by driving the display device by a sequence that can achieve low light reflectance by sensing brightness by a photosensor which is set on a periphery or the like of the display device, and then performing switching to a transparent state once from a mirror maintenance period so as to obtain appropriate light reflectance to the sensed brightness. The brightness to be sensed may be simple ambient brightness or may be brightness of light entering the mirror.

[7. Change in Light Transmittance]

As described above, in a display device of the present disclosure, when the display device attempts to increase or reduce light transmittance of electrochromic elements upon display, it may be somewhat difficult to change the light transmittance rapidly. In that case, several seconds to several ten seconds is required, and thus, it is also possible to auxiliarily employ a method for making it look as if a quick change is made.

For example, upon switching between a transparent state and a mirror state back and forth, when switching to a mirror state is performed, a method can be employed in which lighting on an opposite side to a viewer facing the display device is rapidly darkened. Reversely, when switching to a transparent state is performed, lighting on an opposite side of the display device from the viewer is made brightest simultaneously with or a bit after when drive is switched to drive for a transparent state. Thereafter, a method can be employed in which brightness is reduced little by little as the light transmittance increases, and specified brightness is set at a time point when maximum light transmittance is obtained. By thus allowing the brightness of lighting and the drive of the display device to cooperate with each other, it looks as if the light transmittance is changing very fast and thus the viewer does not feel stress.

[8. Switching Between Modes]

Figure 12:
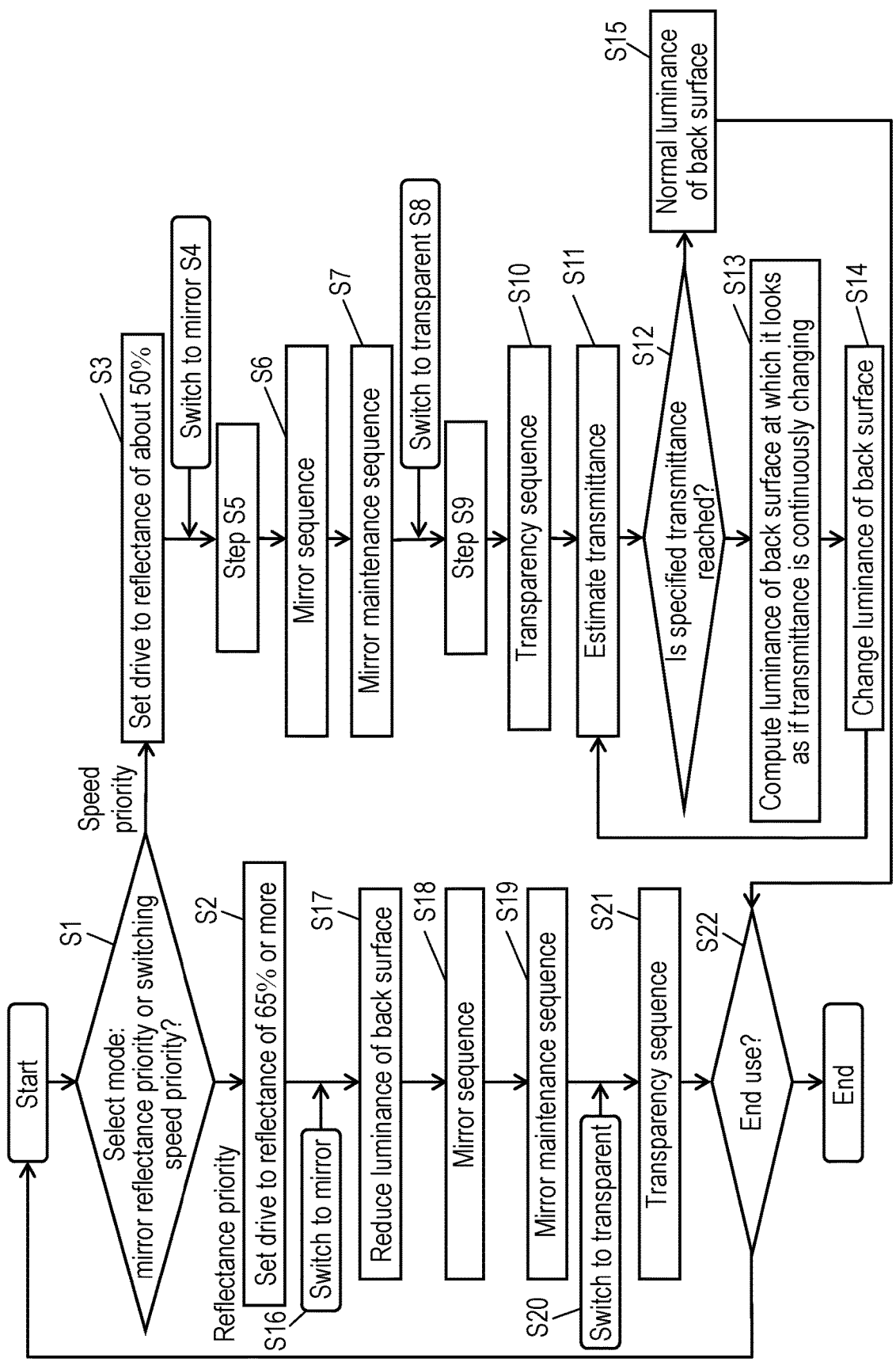
FIG. 12 is a flowchart describing switching between a speed priority mode and a reflectance priority mode.

FIG. 12 is a flowchart describing switching between modes for when priority is given to a switching speed between a transparent state and a mirror state, and when priority is given to light reflectance for a mirror state.

First, at step S1, either mode is selected between a mode in which priority is given to a switching speed between a transparent state and a mirror state (referred to as switching speed priority or speed priority in the drawing), and a mode in which priority is given to light reflectance for a mirror state (referred to as mirror reflectance priority or reflectance priority in the drawing).

In the reflectance priority mode, according to the content described so far, drive is performed aiming that the light reflectance of the electrochromic elements for a mirror state at the central wavelength of the visible spectrum is 65% or more, more preferably, 70% or more (step S2). Alternatively, by the drive methods described so far, or by simply leaving the display device, e.g., by not applying a voltage at all or by connecting both electrodes to a GND level, the display device may be brought into a transparent state only by an action of the mediator. Alternatively, since there are no constrains on switching speed, the display device may be brought into a transparent state by other methods.

When the speed priority mode is selected, first, drive is performed aiming that the light reflectance for a mirror state is about 50%, which is basic drive (step S3). When the display device is brought into a mirror state (mirror switching S4), first, operation is performed to reduce or minimize luminance of the back surface (step S5), and also drive for a mirror state (mirror sequence S6) starts. In the mirror state, when the luminance of the back surface becomes substantially 0, only by surface reflection of the display device of the present disclosure, it looks as if light is reflected. Thus, a viewer is given an illusion that switching to the mirror state is performed very fast. After the switching to the mirror state is completed, processing goes to a step of maintaining the mirror state (mirror maintenance sequence S7). At this time, if a drive voltage for maintaining a normal mirror state is continuously applied, silver gradually increases its amount of deposition. As a result, though the light reflectance improves, a side effect may occur, such as extension of time for deposited silver to be dissolved in the electrolyte solution again. Hence, during a mirror maintenance period, a voltage is applied that is alternated between the mirror sustain voltage and substantially 0 V at a certain frequency or a certain frequency or more. Alternatively, like a step for transparency period 3, a method may be employed in which further silver deposition is prevented by performing drive such as alternate application of voltages of both polarities, positive and negative, with 0 V in between.

A case will be described in which in such a state the light reflectance is continuously maintained at about 50% and then switching to a transparent state is performed. As shown in the flowchart, when the display device is brought into a transparent state (transparent switching S8), first, the luminance of the back surface is allowed to be rapidly increased (step S9), and also drive for a transparent state (transparency sequence S10) starts.

At step S11 of estimating transmittance of light, transmittance of actual light may be measured by a sensor as light transmittance. In addition, since a temporal integral value of an amount of current in the transparency sequence is very strongly correlated to an amount for when silver leaves a surface electrode, light transmittance may be estimated from that. First, a change where transparency rapidly increases and then slowly increases is determined in advance by a visual check.

First, after estimating transmittance (step S11), step S12 is performed to determine whether specified transmittance is reached. Then, luminance of the back surface is computed at which it looks as if the transmittance is continuously changing (step S13), and the luminance of the back surface is changed (step S14). At step S12, steps S11 to S14 are repeated until normal luminance of the back surface (S15) is reached.

On the other hand, in the reflectance priority mode, drive is performed aiming that the light reflectance of the electrochromic elements for a mirror state at the central wavelength of the visible spectrum is 65% or more, more preferably, 70% or more (step S2).

Then, when the display device is brought into a mirror state (mirror switching S16), first, operation is performed to reduce luminance of the back surface (step S17), and also drive for a mirror state (mirror sequence 518) starts. After the switching to the mirror state is completed, processing goes to a step of maintaining the mirror state (mirror maintenance sequence 519). Then, a switching operation to a transparent state (transparent switching S20) is performed, and drive for a transparent state (transparency sequence S21) starts.

When the transparency sequence S21 is completed, processing transitions to step S22 of determining whether to end next use. If it is determined to end, all steps end. If it is determined not to end, processing returns to a first "start" step. Note that in a case of selecting the speed priority mode, when processing reaches step S15, too, processing transitions to step S22. If it is determined to end, all steps end. If it is determined not to end, processing returns to the first "start" step.

Note that although in the flowchart of FIG. 12 switching between the modes is performed at the start or at the completion of a transparent state, switching between the modes can also be performed during a mirror maintenance period. For example, since the amount of silver deposited needs to be reduced to perform switching from the reflectance priority mode to the speed priority mode, a transparency sequence may be adapted for a short period of time to reduce the amount of silver deposited. In addition to the adaptation of a transparency sequence, for example, by simply not applying a voltage or placing a voltage in a floating state during a mirror maintenance period, though speed is very slow, an effect of dissolving silver emerges, enabling to promote switching to a transparent state. Reversely, when switching from the speed priority mode to the reflectance priority mode is performed during a mirror maintenance period, the switching can be performed by increasing the amount of silver deposited by, for example, adapting a sequence in a mirror sequence that is performed after a nuclear growth period, or increasing the voltage during the mirror maintenance period.

Figure 13:
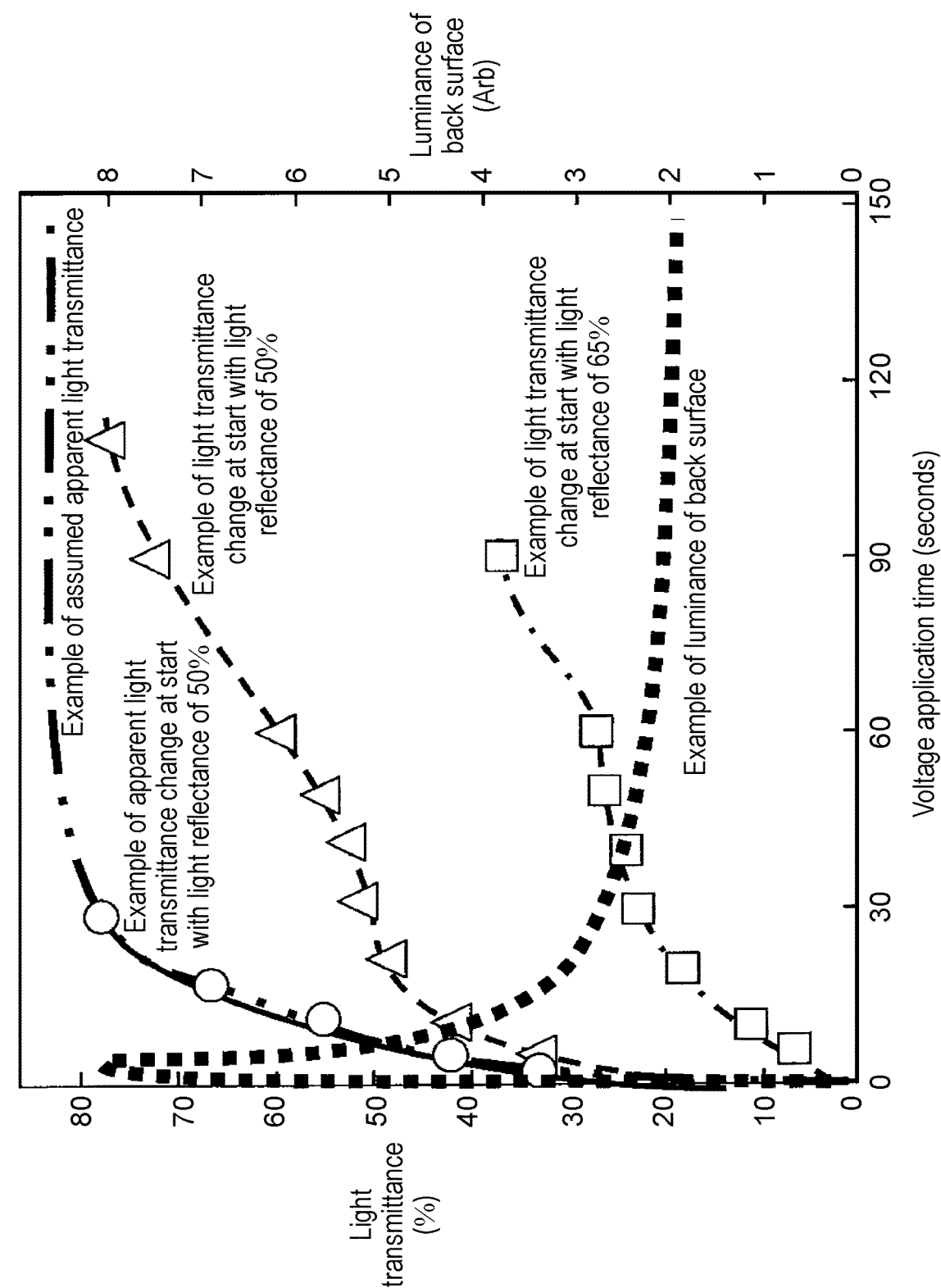
FIG. 13 is a graph showing a relationship between voltage application time and luminance of a back surface and a relationship between voltage application time and light transmittance, for the switching between the modes described in the flowchart of FIG. 12.

A graph of FIG. 13 summarizes a relationship between voltage application time and the luminance of the back surface and a relationship between voltage application time and light transmittance, for switching between the speed priority mode and the reflectance priority mode which is described above with reference to the flowchart of FIG. 12.

For example, apparent light transmittance is assumed, such as a graph represented by a dash-double-dotted line of FIG. 13. The luminance of the back surface represented by a dashed line of FIG. 13 may be controlled such that a product of light transmittance measured by a sensor and/or estimated light transmittance and the luminance of the back surface becomes the graph represented by the dash-double-dotted line of FIG. 13 at each time. By achieving transparency according to such a procedure, it becomes possible to show that, when the light transmittance is smaller than a specified value, like the apparent light transmittance represented by the dash-double-dotted line of FIG. 13, the product of the estimated light transmittance and the luminance of the back surface gently increases and specified light transmittance is obtained in the end. A viewer makes a mistake about the fact that switching to a transparent state proceeds more rapidly than immediately after starting a transparency sequence, and then the light transmittance gradually increases and reaches the specified light transmittance, the fact of which may be utilized.

[9. b* Value and Transparency Speed]

Figure 14:
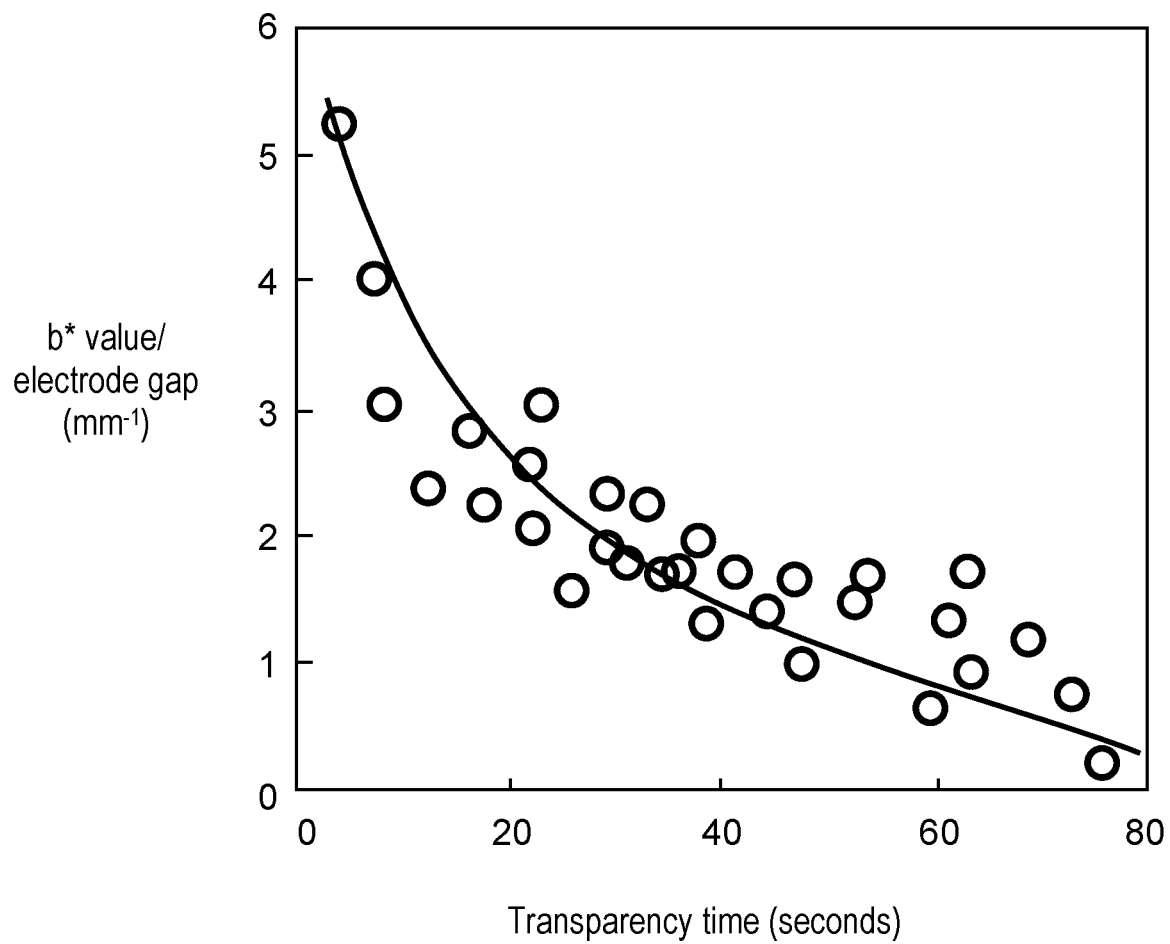
FIG. 14 is a plot and a graph showing a relationship between b* value and transparency speed.

When transparency speeds are compared by variously changing a type of solvent in an electrolyte solution, etc., a strong correlation is seen between a value that is obtained by normalizing a b* value by an electrode gap of a display device (a distance of transmission in the electrolyte solution upon measurement of the b* value), and transparency speed. FIG. 14 is a plot and a graph showing a relationship between the b* value and the transparency speed. In FIG. 14, a horizontal axis is time required when light transmittance changes from 10% to 40% (transparency time), and a vertical axis is a value obtained by normalizing the b* value by the electrode gap (b* value/electrode gap).

Here, in general, a limit for an amount of time that can pass without any stress during a period from when an operation of some kind of device is started to when the operation is attained is considered about 20 seconds. In various devices, reaction time of the devices is set within 20 seconds. Taking this into account, from FIG. 14, it is desirable that the value obtained by normalizing the b* value by the electrode gap (unit: mm) be 3 or more. When the b* value increases, as described above, a transparent image displayed is likely to becomes yellowish. Thus, for a display device, it is desirable that the b* value be as small as possible. However, according to the results, by selecting a solvent for an electrolyte solution to be used in a display device of the present disclosure such that the value obtained by normalizing the b* value by the electrode gap is 3 or more, a further increase in transparency speed can be expected.

[10. Summary]

In a display device of the present disclosure, light transmittance of electrochromic elements for a transparent state (for display) at a central wavelength of a visible spectrum with wavelengths of 380 nm to 780 nm, i.e., around a wavelength of 550 nm, is 70% or more; light reflectance of the electrochromic elements for the transparent state (for display) at the central wavelength is 20% or less; and light reflectance of the electrochromic elements for mirror switching at the central wavelength is 65% or more. As such, in the display device of the present disclosure, since the light transmittance of the electrochromic elements for display is as high as 70% or more, a display image (transparent image) is bright and clear; since the light reflectance for display is as low as 20% or less, glare is reduced and thus viewing of a display image is easy; and since the light reflectance for mirror switching is as high as 65% or more, the display device can be used as a clear mirror.

Note that the display device of the present disclosure is favorable as a transmissive and reflective display device that is highly effective in terms of light-shielding, heat blocking, screening, etc., and that also has a reflection function when the display device has: a light transmittance of the electrochromic elements of 80% or more for display at the central wavelength of the visible spectrum; a light reflectance of 15% or less for display; and a light reflectance of 70% or more for mirror switching.

As described above, the first exemplary embodiment is described as exemplification of a technique disclosed in the present application. However, the technique of the present disclosure is not limited to the first exemplary embodiment, and is also applicable to exemplary embodiments where changes, substitutions, additions, omissions, etc., are made as appropriate.

Implementation Examples

Implementation examples according to the present disclosure are shown below, but the present disclosure is not limited to only the implementation examples.

Preparation Example 1

Preparation of Electrolyte Solution 5a 85 mg (0.5 mM) of $AgNO_3$ was used as an electrochromic material. 806 mg (2.5 mM) of TBABr was used as a supporting electrolyte. 13 mg (0.1 mM) of $CuCl_2$ was used as a mediator. 7.7 g of DMSO and 3.3 g of DMF (DMSO: DMF (weight ratio)=70:30) were used as solvents. PVB (10 weight %) was used as a gelling agent. $AgNO_3$, TBABr, $CuCl_2$, and PVB were dissolved in DMSO and DMF, by which electrolyte solution 5a was prepared.

Preparation Example 2

Preparation of Electrolyte Solution 5b

Electrolyte solution 5b was prepared in the same manner as in preparation example 1, except that 8.8 g of DMSO and 2.2 g of AN (DMSO:AN (weight ratio)=80:20) were used as solvents.

Preparation Example 3

Preparation of Electrolyte Solution 5c

Electrolyte solution 5c was prepared in the same manner as in preparation example 1, except that 8.25 g of DMSO and 2.75 g of PN (DMSO:PN (weight ratio)=75:25) were used as solvents.

Preparation Example 4

Preparation of Electrolyte Solution 5d

Electrolyte solution 5d was prepared in the same manner as in preparation example 1, except that only 11 g of DMSO was used as a solvent.

Implementation Example 1

Manufacturing of Display Device 1a

Display device 1a shown in FIG. 1 was manufactured. Glass substrates were used as a pair of substrates 21, 22, and ITO electrodes were used as a pair of electrodes 31, 32. The two glass substrates with the ITO electrodes were disposed in parallel to each other with a gap of 500 μm provided using spacers. While lead-out portions were fabricated, a periphery was sealed. The lead-out portions can apply voltages to the respective ITO electrodes. Electrolyte solution 5a which served as electrochromic elements was injected into the gap between the ITO electrodes created by the sealing, through an injection opening provided at one location, and only the injection opening was sealed last, by which display device 1a was manufactured. Note that electrode 32 was not a particle-modified electrode, but was a normal electrode using an ITO thin film.

Implementation Example 2

Manufacturing of Display Device 1b

Display device 1b was manufactured in the same manner as in implementation example 1, except for using electrolyte solution 5b instead of electrolyte solution 5a.

Implementation Example 3

Manufacturing of Display Device 1c

Display device 1c was manufactured in the same manner as in implementation example 1, except for using electrolyte solution 5c instead of electrolyte solution 5a.

Implementation Example 4

Manufacturing of Display Device 1d

Display device 1d was manufactured in the same manner as in implementation example 1, except for using electrolyte solution 5d instead of electrolyte solution 5a.

<Drive of the Display Devices>

Using the drive circuit shown in FIG. 9, each display device was driven using the following applied voltages and periods so as to obtain a voltage waveform shown in FIG. 10, by which switching operation was performed from a mirror state to a transparent state.

(Mirror State)
Nucleation voltage (Vm1): 4.30 V
Nuclear growth voltage (Vm2): 2.45 V
Mirror sustain voltage (Vm3): 1.55 V
Nucleation period (Tm1): 1.3 seconds
Nuclear growth period (Tm2): 21.0 seconds
Mirror maintenance period (Tm3): not particularly set
(Transparent State)
Transparency voltage 1 (Vt1): −1.0 V
Transparency voltage 2 (Vt2): −0.6 V
Transparency voltage 3 (Vt3): ±0.6 V
Transparency period 1 (Tt1): 1 second
Transparency period 2 (Tt2): 60 seconds
Transparency period 3 (Tt3): not particularly set <Measurement of the Light Transmittance and Light Reflectance of the Electrolyte Solutions>

For light of a wavelength of 550 nm, the light reflectance of the electrolyte solutions for a mirror state (for mirror switching) and the light transmittance and light reflectance of the electrolyte solutions for a transparent state (for display) were measured, using a spectrocolorimeter (CM-2600d, manufactured by Konica Minolta, inc.). Results of the measurement are shown in table 6. Note that an ultraviolet-visible-near-infrared spectrophotometer (UV-3100PC, manufactured by Shimadzu Corporation) was used for the measurement of the light transmittance.

<Evaluation of the b* and a* Values of Transparent Images>

Each display device was placed on a white reference plate and then color was measured by an SCE (Specular Component Excluded) method, using a spectrocolorimeter (CM-2600d, manufactured by Konica Minolta, inc.), and displayed using the L*a*b* color system. Evaluation of each of the b* and a* values was performed using, as reference values, a b* value (20) and an a* value (1) of a transparent image obtained by display device 1d of implementation example 4. Results of the measurement are shown in table 6.

<Evaluation of Switching Characteristics of the Display Devices>

Figure 15:
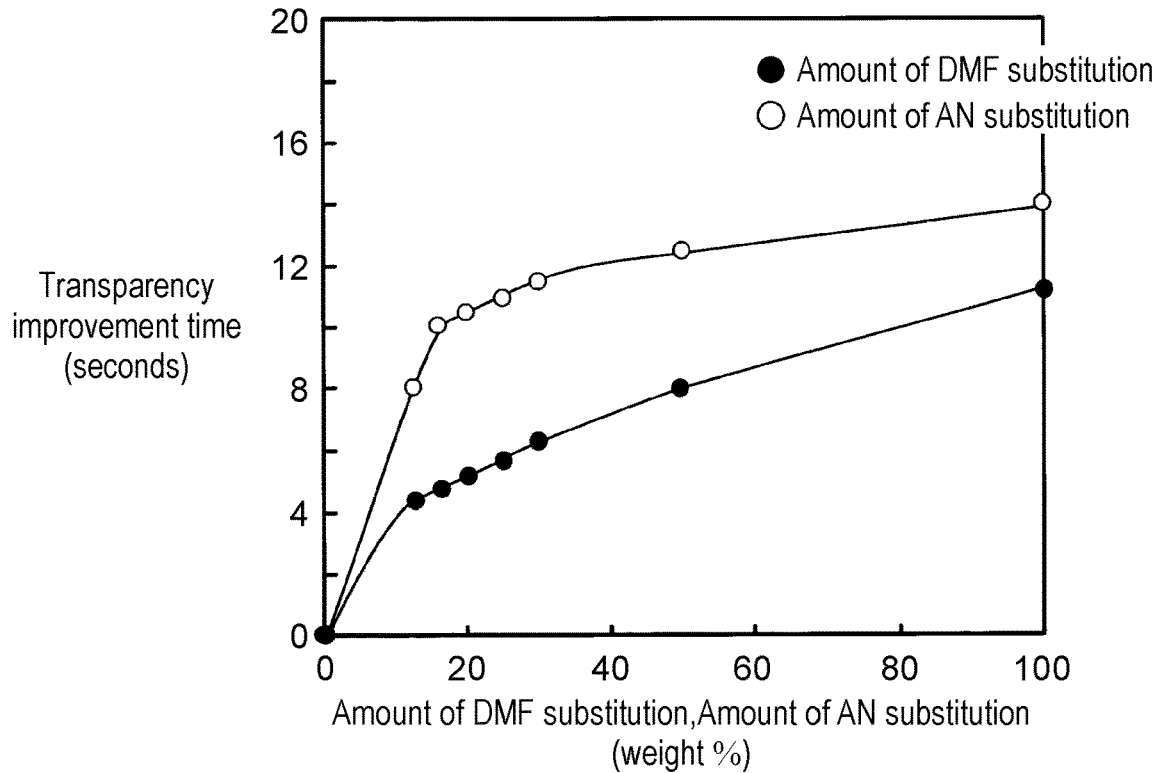
FIG. 15 is a graph showing switching characteristics of display devices of implementation examples.

When the display devices were driven in the above-described manner, a speed of switching operation from the mirror state to the transparent state (transparency speed) was measure. Results of the measurement are shown in FIG. 15. FIG. 15 is a graph obtained by comparing transparency speeds obtained when display device 1a of implementation example 1 and display devices 1a-1, 1a-2, 1a-3, 1a-4, 1a-5 were driven, with a transparency speed obtained when display device 1d of implementation example 4 was driven. Display devices 1a-1, 1a-2, 1a-3, 1a-4, 1a-5 used electrolyte solutions 5a-1, 5a-2, 5a-3, 5a-4, 5a-5 which were obtained by changing the solvents (DMSO:DMF (weight ratio)=70: 30) contained in electrolyte solution 5a to DMSO:DMF (weight ratio)=86:14, 83:17, 80:20, 75:25, or 50:50. Transparency improvement time on a vertical axis is time reduced compared to time required to achieve transparency when display device 1d is driven, and a horizontal axis is an amount of DMF substitution for DMSO.

Figure 16:
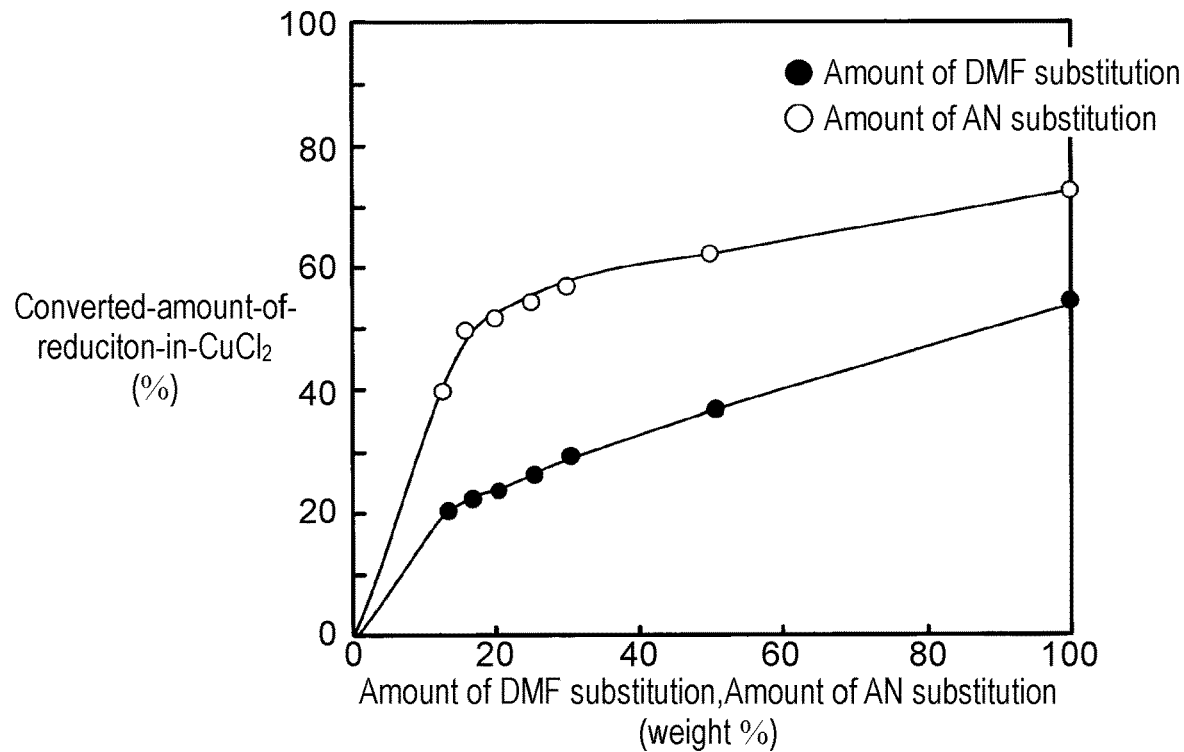
FIG. 16 is a graph showing switching characteristics of the display devices of the implementation examples.

On the other hand, since the transparency speed increases by substituting DMF for DMSO, it was checked how much content of $CuCl_2$, which was one of factors for determining the transparency speed, was able to be reduced. FIG. 16 is a graph obtained by comparing the transparency speeds obtained when display devices 1a, 1a-1, 1a-2, 1a-3, 1a-4, 1a-5 were driven, with the transparency speed obtained when display device 1d of implementation example 4 was driven. A converted-amount-of-reduction-in-$CuCl_2$ on a vertical axis is obtained by converting a difference between the transparency speed obtained when display device 1d was driven and the transparency speeds obtained when display devices 1a, 1a-1, 1a-2, 1a-3, 1a-4, 1a-5 were driven, with the speed of display device 1d=100% $CuCl_2$ content, into an amount of reduction in $CuCl_2$. A horizontal axis is an amount of DMF substitution for DMSO.

In addition, FIGS. 15 and 16 also show transparency improvement time and a converted-amount-of-reduction-in-$CuCl_2$ with respect to an amount of AN substitution for DMSO for display device 1b of implementation example 2 and display devices using electrolyte solutions which were obtained by changing the solvents (DMSO:AN (weight ratio)=70:30) contained in electrolyte solution 5b by the same weight ratios as the above-described DMF.

As shown in FIGS. 15 and 16, when the amount of DMF substitution and the amount of AN substitution are less than 14%, changes in the transparency improvement time and the converted-amount-of-reduction-in-$CuCl_2$ with respect to the amount of DMF substitution and the amount of AN substitution are large, but when the amount of DMF substitution and the amount of AN substitution are 14% or more, changes in the transparency improvement time and the converted-amount-of-reduction-in-$CuCl_2$ with respect to the amount of DMF substitution and the amount of AN substitution are small. Hence, by setting the amount of DMF substitution and the amount of AN substitution to 14% or more, the transparency improvement time can be made faster and can be reduced in variation.

Here, when time it takes to obtain light transmittance (50% or more) at which humans feel that it has become transparent is considered as transparency time, the transparency time for when only DMSO is used is about 30 seconds. Then, as shown in FIG. 15, when the amount of DMF substitution and the amount of AN substitution are increased (14% to 50%), the transparency time is improved by 4 seconds to 8 seconds for DMF and 8 seconds to 12 seconds for AN. That is, the transparency time is 26 seconds to 22 seconds when the amount of DMF substitution is 14% to 50%, and is 22 seconds to 18 seconds when the amount of AN substitution is 14% to 50%. By setting the amount of AN substitution to 14% or more, the transparency time can be reduced in the above-described range where humans can handle devices without any stress. Thus, it is desirable to select AN.

Figure 17:
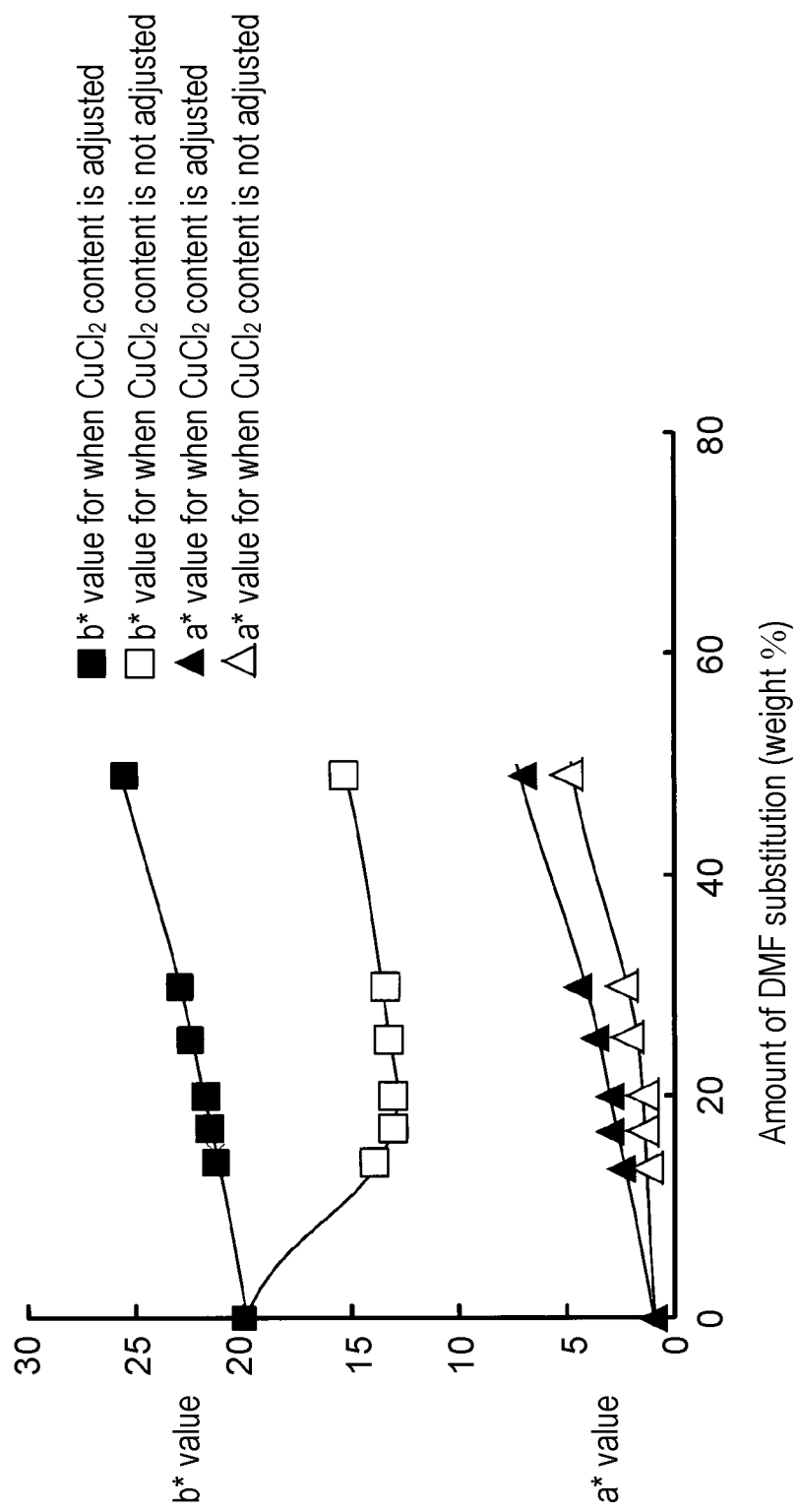
FIG. 17 is a graph summarizing results shown in FIG. 15 and results shown in FIG. 16 for DMF.
Figure 18:
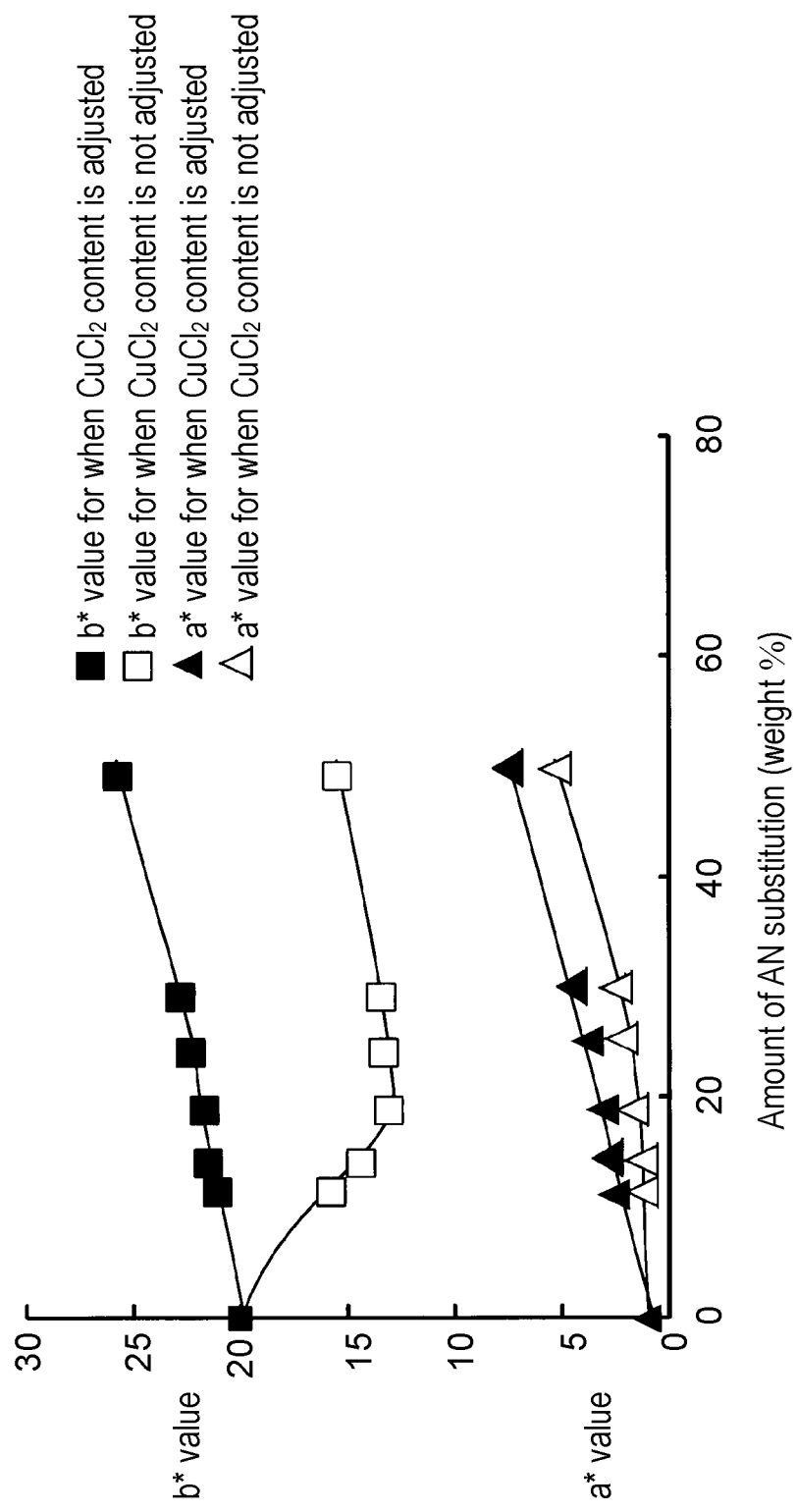
FIG. 18 is a graph summarizing results shown in FIG. 15 and results shown in FIG. 16 for AN.

FIGS. 17 and 18 show graphs summarizing results of FIGS. 15 and 16. A vertical axis is a* and b* values, and a horizontal axis is the amount of DMF substitution for DMSO and the amount of AN substitution for DMSO. The a* and b* values are plotted for a case of adjusting $CuCl_2$ content and a case of not adjusting, with the transparency speed being uniform.

When DMF and AN are used, the b* value increases as the amounts of DMF and AN substitution increase. Hence, by adjusting the $CuCl_2$ content, the b* value takes a minimum value in the process of increasing the amount of DMF substitution and the amount of AN substitution. This is a 20% to 50% range of the amount of DMF substitution and the amount of AN substitution, with about 30% being at a center. $CuCl_2$ content near a central value, i.e., $CuCl_2$ content of display devices 1a and 1b, is 69% when $CuCl_2$ content of display device 1d is 100%.

Display devices 1a to 1c of implementation examples 1 to 3 are to compare display characteristics for a case in which a solvent that substitutes a part of DMSO is changed to materials other than DMF, and have uniform $CuCl_2$ content of 69% as with display device 1a of implementation example 1.

Note that table 6 also shows freezing points of the respective electrolyte solutions.

TABLE 6

| Implementation example | Light reflectance for mirror state (%) | Transparency state | | b* value | a* value | Freezing point of electrolyte solution (° C.) |
| --- | --- | --- | --- | --- | --- | --- |
| | | Light transmittance (%) | Light reflectance (%) | | | |
| 1 | 73.0 | 76.9 | 9.0 | 16 | 2 | −4 |
| 2 | 66.0 | 75.4 | 9.0 | 16 | 2 | −5 |
| 3 | 72.0 | 82.4 | 9.0 | 4 | −1 | −3 |
| 4 | 65.0 | 75.2 | 8.0 | 20 | 1 | 15 |

As shown in table 6, in all of display devices 1a to 1d, for light of the central wavelength of the visible spectrum (wavelength of 550 nm), the light reflectance of the electrolyte solutions for a mirror state is 65% or more, and the light transmittance of the electrolyte solutions for a transparent state (for display) is 70% or more and the light reflectance is 20% or less. Particularly, in display devices 1a and 1c, the light reflectance of the electrolyte solutions for a mirror state is as high as over 70%. As such, display devices 1a to 1d are all display devices that have a reflection function and that are highly effective in terms of light-shielding, heat blocking, screening, etc.

In all transparent images of display devices 1a to 1c, the b* value is reduced compared to the reference b* value of a transparent image of display device 1d (=20), and the a* value is substantially the same as the reference a* value of the transparent image of display device 1d (=1), and the transparent images of display devices 1a to 1c all have a good balance between yellowness and redness.

Figure 19:
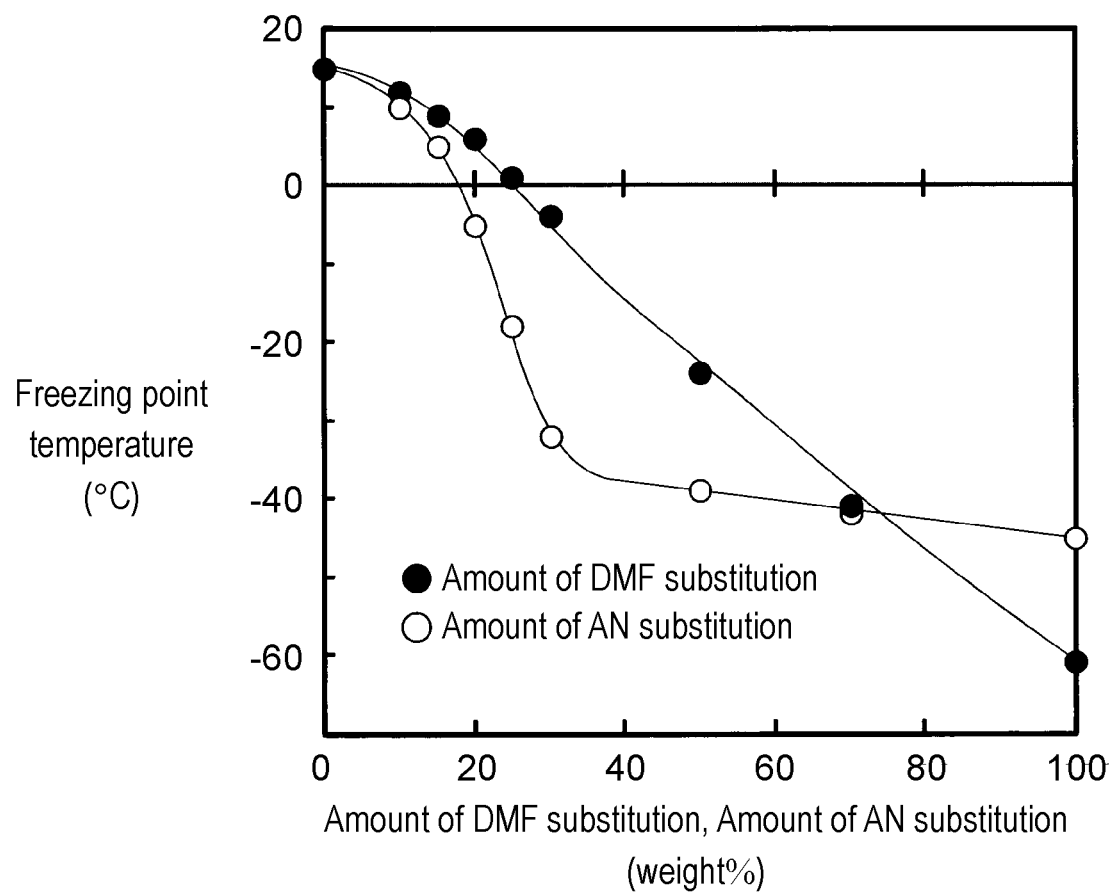
FIG. 19 is a diagram showing changes in freezing point for an amount of DMF substitution and an amount of AN substitution for DMSO.

In addition, FIG. 19 is a diagram showing changes in freezing point for the amount of DMF substitution and the amount of AN substitution for DMSO. In a case of substitution by DMF, the freezing point changes and decreases substantially linearly from a freezing point for an amount of DMF substitution of 0% to a freezing point for an amount of DMF substitution of 100%. On the other hand, in a case of substitution by AN, the freezing point significantly drops at an amount of AN substitution of 0% to 30%. This can be estimated to result from a drop in freezing point occurring when two or more materials are mixed together. In general, for outdoor use, the freezing point needs to be −30° C. or less. AN can clear such a condition at an amount of AN substitution of 30% or more, and thus can be adapted to use in a wide range of areas. Specifically, AN can be adapted to windows for outdoors (e.g., for buildings, for automobiles, and for railroads), rear-view mirrors for automobiles, etc. In addition, in a case of an amount of AN substitution of 30% to 40%, since the b* value of color can also be set in an allowable range, selecting AN substation increases a range of applications and thus is more desirable.

As described above, the exemplary embodiment is described as exemplification of the technique of the present disclosure. To do so, the accompanying drawings and a detailed description are provided.

Therefore, components described in the accompanying drawings and the detailed description may include not only components essential for solving problems, but also components not essential for solving problems for exemplifying the technique. Hence, the fact that the components not essential are described in the accompanying drawings or the detailed description should not be construed that the components not essential are essential.

In addition, the above-described exemplary embodiment is to exemplify the technique of the present disclosure, and thus, various changes, substitutions, additions, omissions, etc., which come within the range of the claims or the range of equivalency of the claims may be made to the exemplary embodiment.

The present disclosure can be suitably used as, for example, mirror-switching display devices.

What is claimed is:

1. A display device that switches from transparent state to mirror state or switches from mirror state to transparent state, the display device comprising:
   a first electrode;
   a second electrode;
   a circuit connected to the first electrode and the second electrode;
   an electrochromic element containing a silver compound;
   a mediator including a copper compound; and
   a solvent having non-aqueous solvents including dimethyl sulfoxide and N, N-dimethylformamide,
   wherein
   a ratio of the N, N-dimethylformamide to the solvent is 20% to 50%,
   11 g of the solvent contains 0.065 mM to 0.075 mM of copper in the copper compound,
   the electrochromic element, the mediator, and the solvent are between the first and the second electrodes, and
   the circuit:
      applies a first voltage between the first and the second electrodes,
      detects a voltage between the first and the second electrodes;
      performs a comparison of the first voltage and the detected voltage; and
      applies, in response to the comparison indicating that the detected voltage is larger than the first voltage, a second voltage between the first and the second electrodes, the second voltage being lower than the first voltage.

* * * * *